United States Patent
Oshita et al.

(10) Patent No.: US 7,337,382 B2
(45) Date of Patent: Feb. 26, 2008

(54) DATA TRANSFER CONTROL DEVICE, ELECTRONIC INSTRUMENT, AND DATA TRANSFER CONTROL METHOD

(75) Inventors: Shun Oshita, Sapporo (JP); Shinsuke Kubota, Sapporo (JP); Hiroaki Shimono, Fujimi-cho (JP)

(73) Assignee: Seiko Epson Corporation, Tokyo (JP)

( * ) Notice: Subject to any disclaimer, the term of this patent is extended or adjusted under 35 U.S.C. 154(b) by 388 days.

(21) Appl. No.: 10/941,826

(22) Filed: Sep. 16, 2004

(65) Prior Publication Data

US 2005/0091564 A1     Apr. 28, 2005

(30) Foreign Application Priority Data

Oct. 15, 2003   (JP) ............................. 2003-355047

(51) Int. Cl.
*G08C 25/02* (2006.01)
*H04L 1/18* (2006.01)

(52) U.S. Cl. ...................................................... 714/748
(58) Field of Classification Search .................. 714/748
See application file for complete search history.

(56) References Cited

U.S. PATENT DOCUMENTS

| | | | | |
|---|---|---|---|---|
| 4,893,248 | A | * | 1/1990 | Pitts et al. ................... 705/400 |
| 6,219,736 | B1 | * | 4/2001 | Klingman .................... 710/315 |
| 6,363,425 | B1 | * | 3/2002 | Hook et al. .................. 709/226 |
| 6,542,513 | B1 | | 4/2003 | Franke et al. |
| 2002/0169904 | A1 | | 11/2002 | Kamihara et al. |

FOREIGN PATENT DOCUMENTS

| | | |
|---|---|---|
| JP | A-11-298555 | 10/1999 |
| JP | A-2000-82019 | 3/2000 |
| JP | A-2001-230835 | 8/2001 |
| JP | A 2002-342261 | 11/2002 |

* cited by examiner

*Primary Examiner*—Joseph D Torres
(74) *Attorney, Agent, or Firm*—Oliff & Berridge, PLC

(57) ABSTRACT

A data transfer control device for data transfer through a bus, includes: a buffer controller which controls access to a packet buffer which stores data; and a transfer controller which controls transfer of the data stored in the packet buffer. A transaction for performing data transfer with a transfer destination is issued, and when a negative acknowledgment (NAK) response to the issued transaction is returned from the transfer destination, issuance of a retransmission transaction for the NAK response is allowed after waiting for a predetermined skip timing.

10 Claims, 30 Drawing Sheets

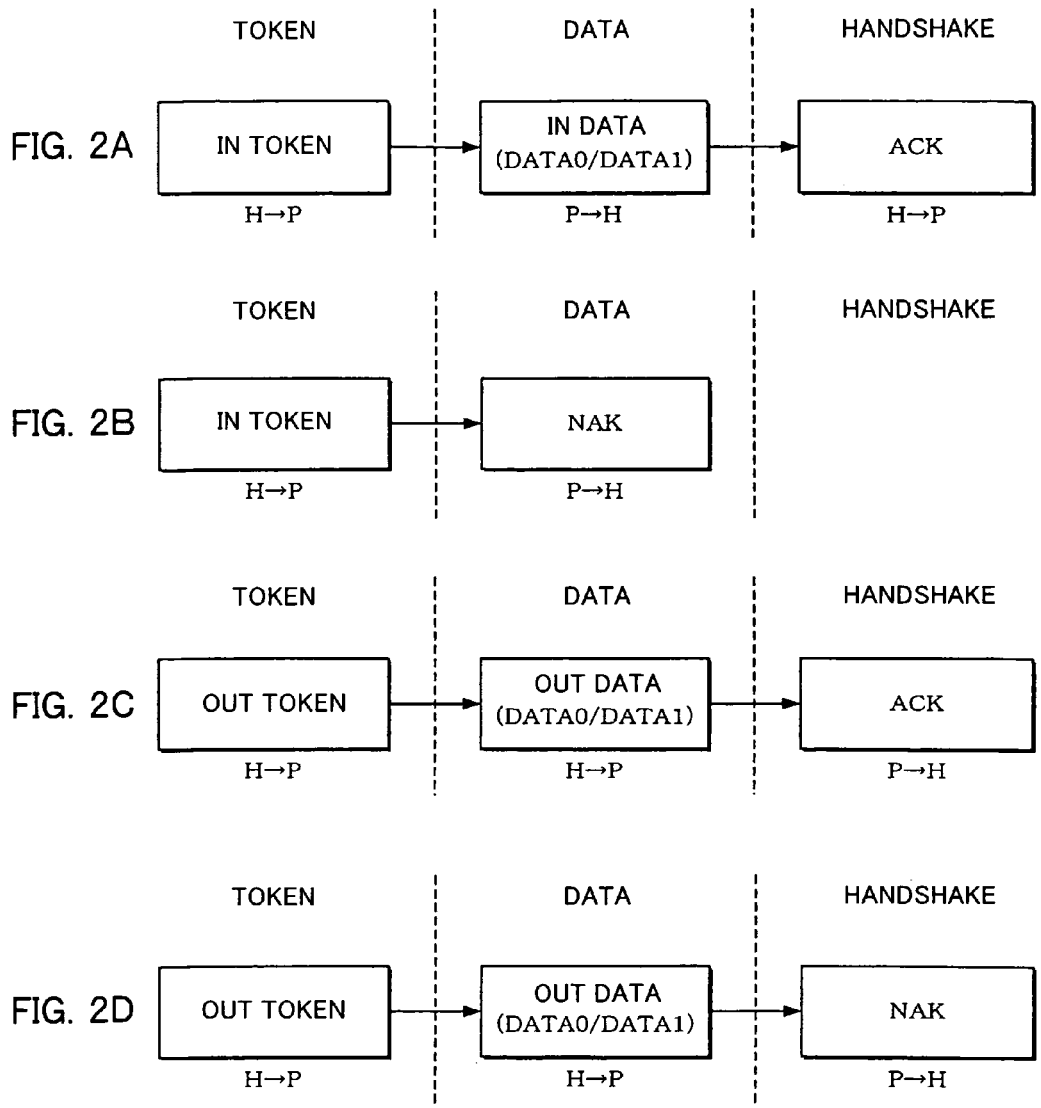

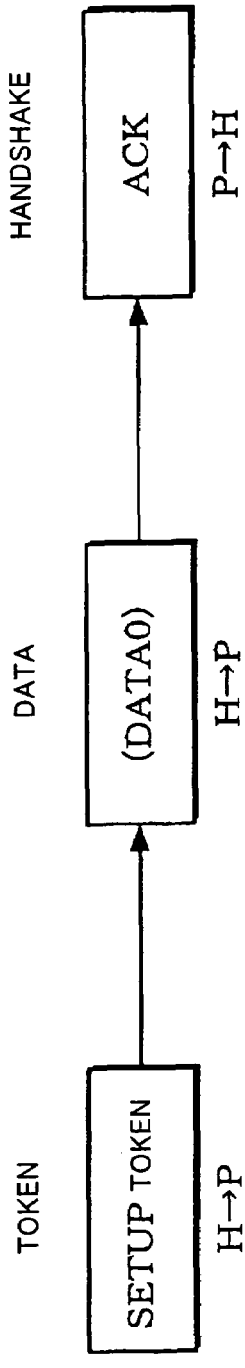
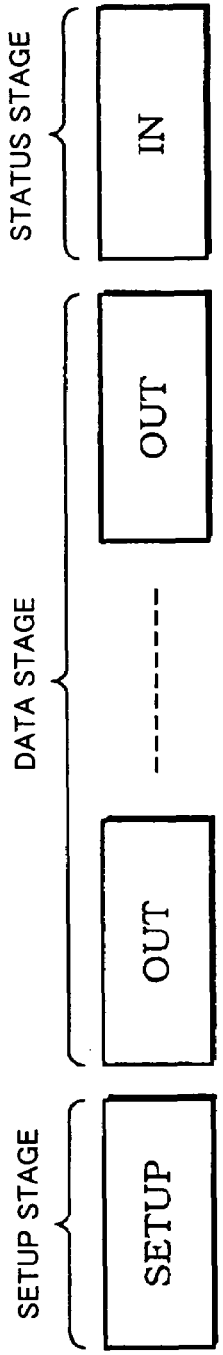
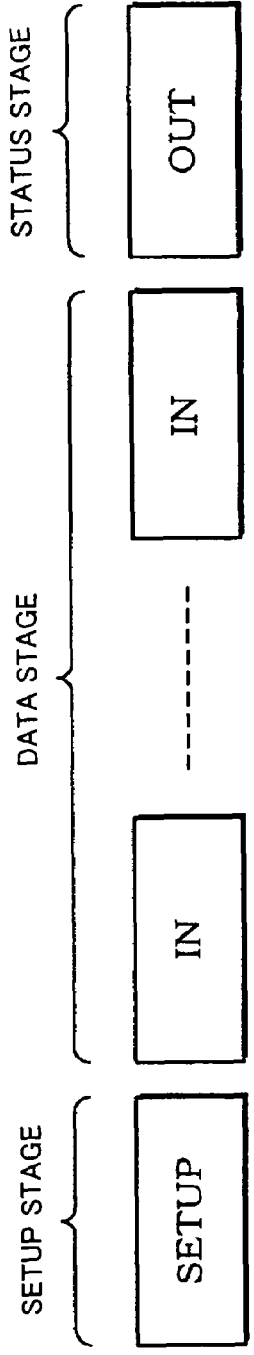
FIG. 3A
FIG. 3B
FIG. 3C

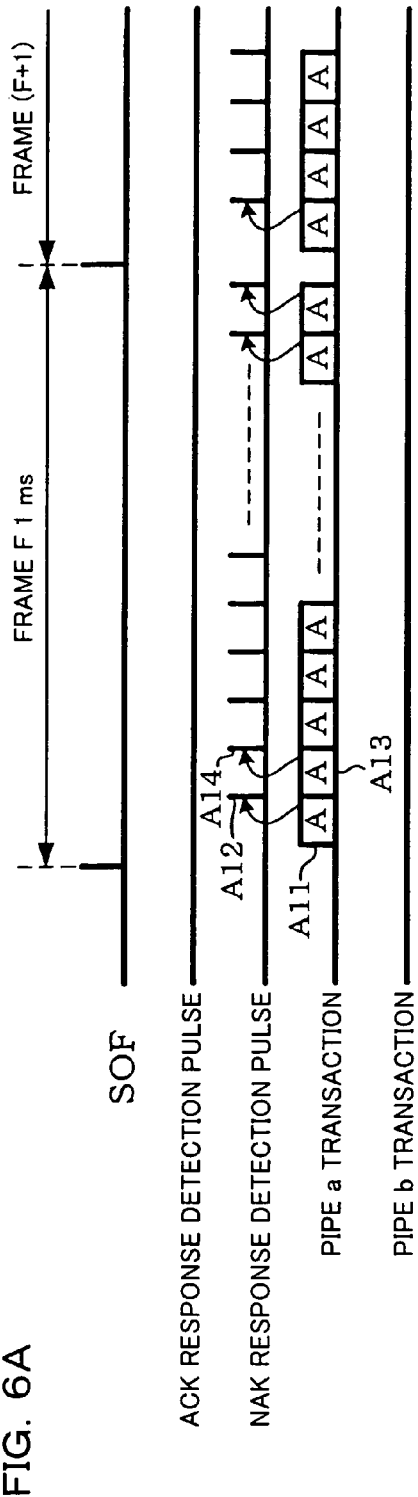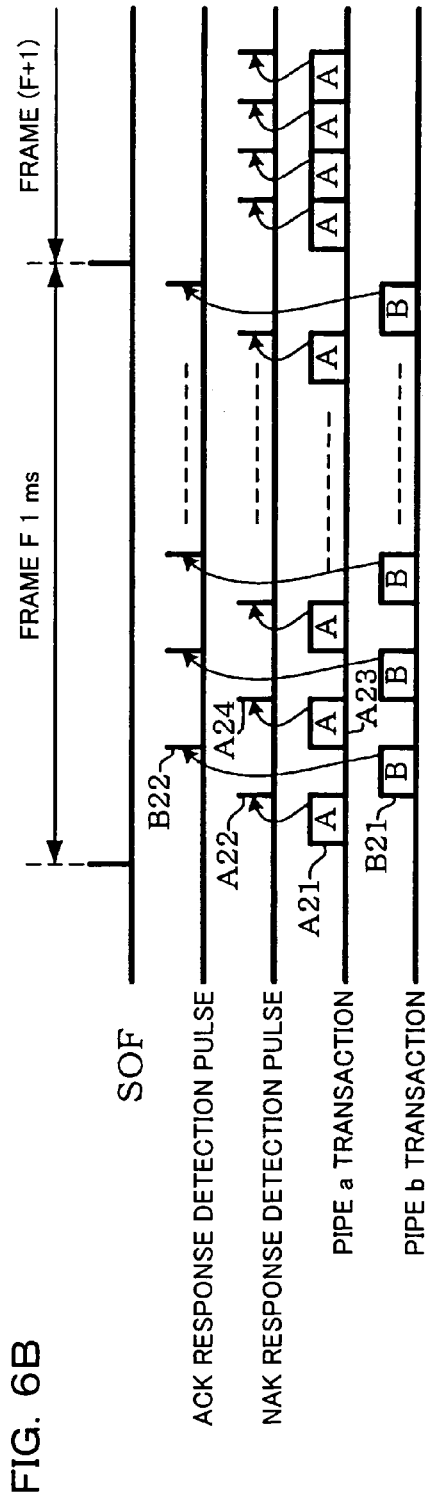

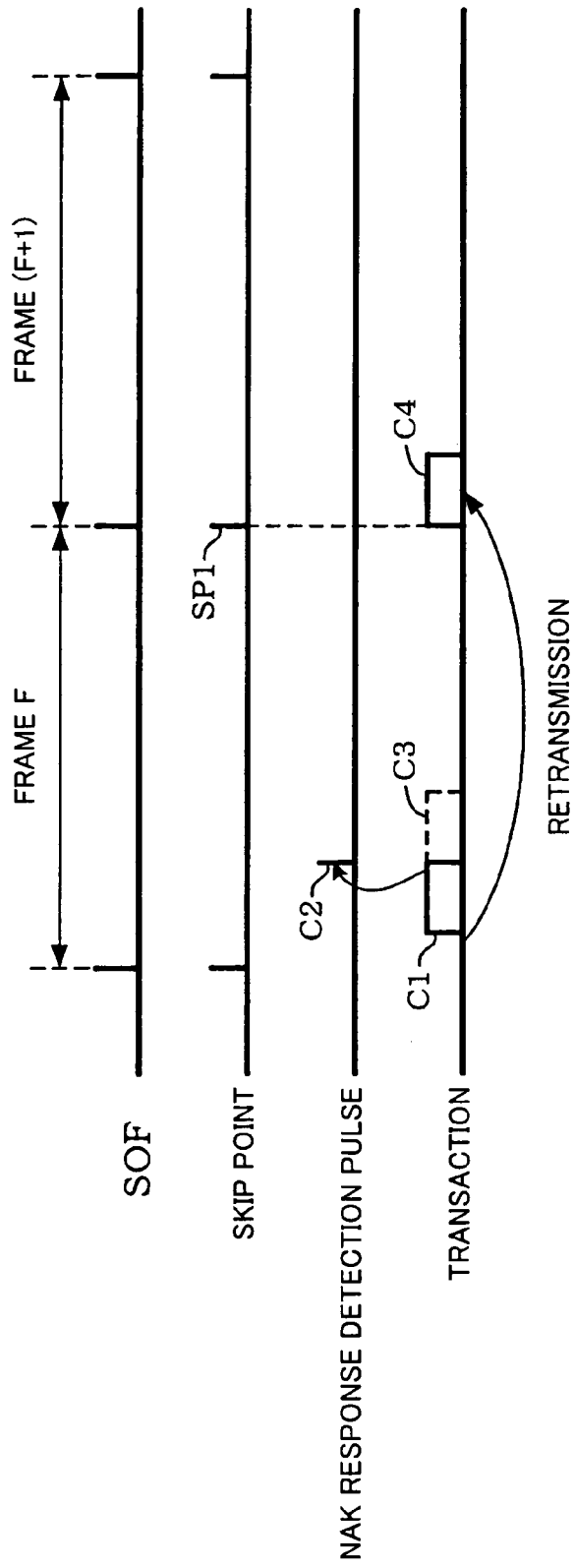

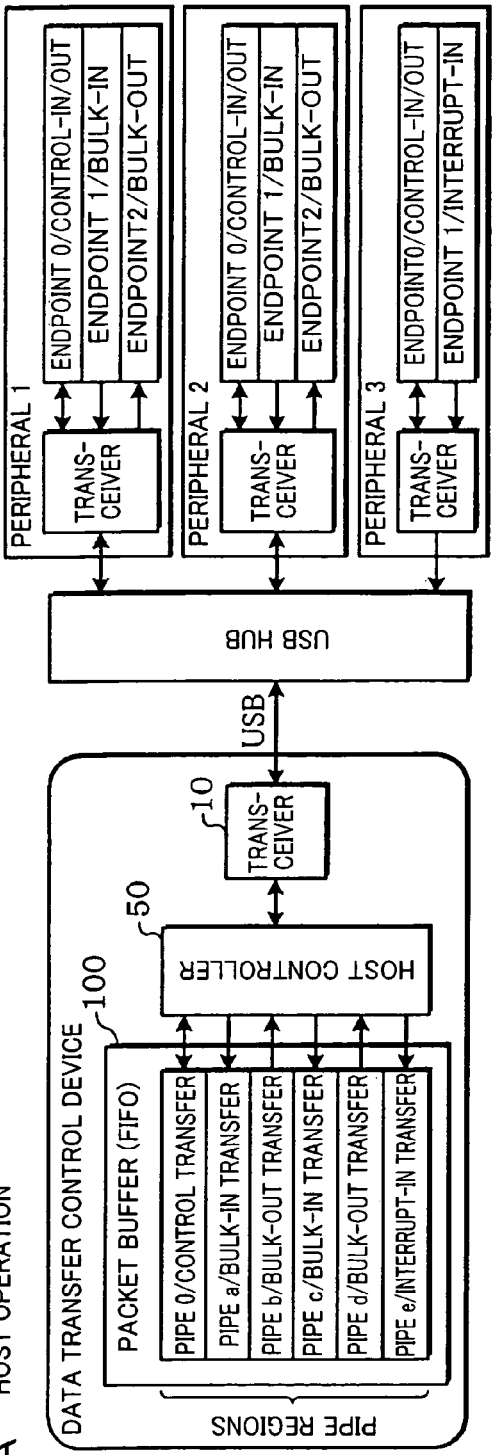
FIG. 12A HOST OPERATION
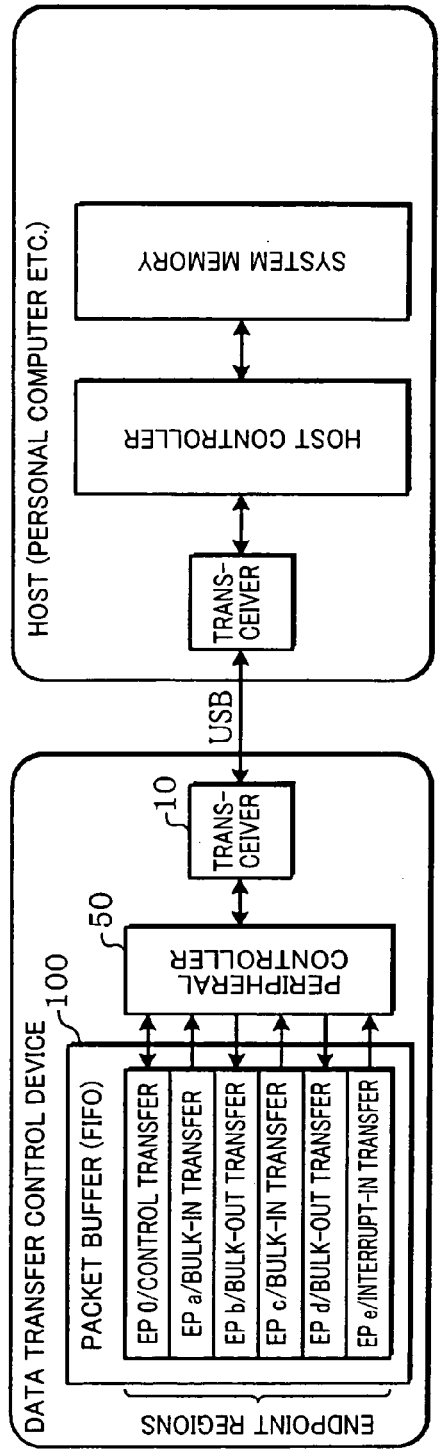
FIG. 12B PERIPHERAL OPERATION

FIG. 21

| CurrentTgPipeTyp | CurrentTgPipeNum | CurrentTgPipe_a | CurrentTgPipe_b | --- | CurrentTgPipe_o | CurrentTgPipe_p |
|---|---|---|---|---|---|---|
| 0 0 | 0 0 0 0 | 1 | 0 | --- | 0 | 0 |
|  | 0 0 0 1 | 0 | 1 | --- | 0 | 0 |
|  | --- | --- | --- | --- | --- | --- |
|  | 1 1 1 0 | 0 | 0 | --- | 1 | 0 |
|  | 1 1 1 1 | 0 | 0 | --- | 0 | 1 |
| 0 1 | --- | --- | --- | --- | --- | --- |
| 1 0 | 0 0 0 0 | 1 | 0 | --- | 0 | 0 |
|  | 0 0 0 1 | 0 | 1 | --- | 0 | 0 |
|  | --- | --- | --- | --- | --- | --- |
|  | 1 1 1 0 | 0 | 0 | --- | 1 | 0 |
|  | 1 1 1 1 | 0 | 0 | --- | 0 | 1 |
| 1 1 | --- | 0 | 0 | --- | 0 | 0 |

DATA TRANSFER CONTROL DEVICE, ELECTRONIC INSTRUMENT, AND DATA TRANSFER CONTROL METHOD

Japanese Patent Application No. 2003-355047, filed on Oct. 15, 2003, is hereby incorporated by reference in its entirety.

BACKGROUND OF THE INVENTION

The present invention relates to a data transfer control device, an electronic instrument, and a data transfer control method.

The Universal Serial Bus (USB) 1.1 standard defines a data transfer rate of 12 megabits per second (Mbps) (full-speed (FS) mode) required for various peripheral devices of personal computers, and a data transfer rate of 1.5 Mbps (low-speed (LS) mode) aiming at connection with less expensive peripheral devices. In recent years, the USB 2.0 standard has been developed and has attracted attention as a standard which can achieve a data transfer rate of 480 Mbps (high-speed (HS) mode), which is remarkably higher than the data transfer rate of the USB 1.1 standard, while having compatibility with the USB 1.1 standard.

The market for products conforming to the USB 2.0 standard which supports the HS mode has grown steadily. The USB On-The-Go (OTG) standard has been developed by the USB Implementers Forum (USB-IF) as a standard which realizes a simple host of the USB standard. The OTG standard (OTG 1.0) developed as an extension of the USB 2.0 standard has the potential for creating a new added value for the USB interface, and development of applications making use of its characteristics has been anticipated.

A peripheral (peripheral device), which has been connected with a host (personal computer or the like) through the USB, can be provided with the host function by utilizing the simple host realized by the OTG standard or the like. This enables data to be transferred between peripherals by connecting the peripherals through the USB. For example, an image from a digital camera can be printed by directly connecting the digital camera with a printer, or image data or video data can be saved by connecting a digital camera or a digital video camera with a storage device.

It becomes unnecessary to connect the peripheral with the host through the USB by utilizing the simple host realized by the OTG standard or the like. Therefore, this technology is expected to be applied to portable instruments driven by a built-in battery. Therefore, it is important to reduce power consumption of data transfer conforming to the USB standard and to effectively use the transfer band.

BRIEF SUMMARY OF THE INVENTION

One aspect of the present invention relates to a data transfer control device including:
a buffer controller which controls access to a packet buffer which stores data; and
a transfer controller which controls transfer of the data stored in the packet buffer,
wherein a transaction for performing data transfer with a transfer destination is issued, and
wherein, when a negative acknowledgment (NAK) response to the issued transaction is returned from the transfer destination, issuance of a retransmission transaction for the NAK response is allowed after waiting for a predetermined skip timing.

Another aspect of the present invention relates to a data transfer control device including:
a buffer controller which controls access to a packet buffer which stores data; and
a transfer controller which controls transfer of the data stored in the packet buffer,
wherein a token is issued to an endpoint of a peripheral, and
wherein, when a negative acknowledgment (NAK) response corresponding to the token is returned from the peripheral at least once, reissuance of the token is allowed after waiting for a predetermined skip timing.

A further aspect of the present invention relates to an electronic instrument including:
any one of the above data transfer control devices; and
a device which performs output processing, fetch processing or storage processing of data transferred through the data transfer control device and the bus; and
a processing section which controls data transfer of the data transfer control device.

BRIEF DESCRIPTION OF THE SEVERAL VIEWS OF THE DRAWING

FIGS. 2A, 2B, 2C, and 2D are illustrative of transactions of a bulk transfer.

FIGS. 3A, 3B, and 3C are illustrative of transactions of a control transfer.

FIGS. 6A and 6B are timing diagrams in the case where a NAK response is returned for a transaction as a comparative example.

FIG. 7 is illustrative of the case where a skip point is provided in frame units in an embodiment of the present invention.

FIGS. 12A and 12B are illustrative of a pipe region and an endpoint region.

FIG. 21 shows an operation example of a current CTL/BLK transfer pipe number decode section.

DETAILED DESCRIPTION OF THE EMBODIMENT

Figure 1A:
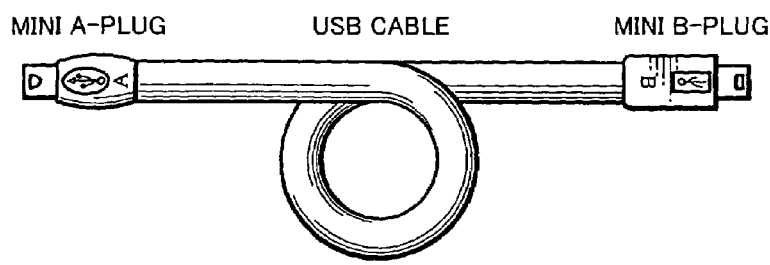
FIGS. 1A, 1B, and 1C are illustrative of the USB OTG standard.

Embodiments of the present invention are described below. Note that the embodiments described hereunder do not in any way limit the scope of the invention defined by the claims laid out herein. Note also that not all of the elements of these embodiments should be taken as essential requirements to the means of the present invention.

In the USB standard, the host schedules data transfers between the host and the device in transaction units. When the host receives a negative acknowledgment (NAK) packet from the device for a transaction issued by the host (when a NAK response is returned), the host determines that the transaction has not been normally completed, and must reissue the same transaction (issue a retransmission transaction).

However, if the retransmission transaction is continuously issued until an ACK response is returned, a large number of retransmission transactions for which the NAK response is returned may be issued within a frame. In this case, the band cannot be effectively used since the band for transfer of another pipe is used, and electric power is uselessly consumed by issuing a large number of retransmission transactions.

According to the following embodiments, a data transfer control device, an electronic instrument, and a data transfer control method which achieve effective use of the data transfer band and a reduction of power consumption can be provided.

One embodiment of the present invention provides a data transfer control device including:

a buffer controller which controls access to a packet buffer which stores data; and a transfer controller which controls transfer of the data stored in the packet buffer, wherein a transaction for performing data transfer with a transfer destination is issued, and wherein, when a negative acknowledgment (NAK) response to the issued transaction is returned from the transfer destination, issuance of a retransmission transaction for the NAK response is allowed after waiting for a predetermined skip timing.

According to this embodiment, the retransmission transaction is prevented from being issued in a period between the timing at which the NAK response is returned and the predetermined skip timing. The retransmission transaction can be immediately issued after the predetermined skip timing has been passed if a transaction of another transfer has not been issued. If a transaction of another transfer has been issued, the retransmission transaction can be issued after the transaction of another transfer is completed. Therefore, a problem in which a large number of retransmission transactions are issued is eliminated, whereby the band can be effectively used, and power consumption can be reduced by reducing unnecessary retransmission transactions.

With this data transfer control device, on condition that the retransmission transaction for the NAK response has been issued one or more times, issuance of a next retransmission transaction may be allowed after waiting for the predetermined skip timing.

This data transfer control device may include:

a counter which is initialized when a positive acknowledgment (ACK) response is returned from the transfer destination, and counts the NAK response from the transfer destination, and issuance of a retransmission transaction for a last NAK response returned when a count of the NAK response has reached a predetermined number may be allowed after waiting for the predetermined skip timing.

Instead of issuing the retransmission transaction after the predetermined skip timing when the NAK response is returned for the transaction once, after issuing the retransmission transaction corresponding to the NAK response at least once, the retransmission transaction corresponding to the last NAK response can be issued after the predetermined skip timing. This may enable data transfer with the transfer destination which has become ready for transfer immediately after the NAK response to be realized by the next retransmission transaction using a simple configuration, whereby the band can be more effectively used.

With this data transfer control device, the predetermined skip timing may be within a frame subsequent to a frame in which the NAK response has been returned.

With this data transfer control device, a plurality of skip timings may be set in one frame.

With this data transfer control device, the predetermined skip timing may be a skip timing among the plurality of the skip timings which comes first after the transaction has been issued.

Another embodiment of the present invention provides a data transfer control device for data transfer through a bus, the data transfer control device including:

a buffer controller which controls access to a packet buffer which stores data; and a transfer controller which controls transfer of the data stored in the packet buffer, wherein a token is issued to an endpoint of a peripheral, and wherein, when a negative acknowledgment (NAK) response corresponding to the token is returned from the peripheral at least once, reissuance of the token is allowed after waiting for a predetermined skip timing.

This data transfer control device may include a counter which is initialized when a positive acknowledgment (ACK) response is returned corresponding to the token, and counts the NAK response corresponding to the token, and reissuance of the token may be allowed after waiting for the predetermined skip timing when a count of the NAK response has reached a predetermined number.

With this data transfer control device, the predetermined skip timing may be within a frame subsequent to a frame in which the token has been issued.

With this data transfer control device, a plurality of skip timings may be set in one frame.

With this data transfer control device, the predetermined skip timing may be a skip timing among the plurality of the skip timings which comes first after the token has been issued, or a skip timing among the plurality of the skip timings which comes first after the NAK response corresponding to the token has been returned.

Any of these data transfer control devices may include a skip timing setting register which is used for setting the skip timing, and the skip timing setting register may be provided for each endpoint of a peripheral.

Since whether or not to allow issuance of the retransmission transaction corresponding to the NAK response or reissuance of the token can be changed according to the transfer destination, the band can be more effectively used when controlling data transfer with a plurality of transfer destinations.

Any of these data transfer control devices may include a skip mode setting register which is used for setting whether or not to allow issuance of the retransmission transaction or the reissuance of the token after waiting for the predetermined skip timing, and the skip mode setting register may be provided for each endpoint of a peripheral.

Since the interval of issuance of the retransmission transaction corresponding to the NAK response or reissuance of the token can be changed according to the transfer destination, the band can be more effectively used when controlling data transfer with a plurality of transfer destinations.

Any of these data transfer control devices may include:

a state controller which controls a plurality of states including a state of a host operation in which the data transfer control device operates in a role of a host, and a state of a peripheral operation in which the data transfer control device operates in a role of a peripheral, the transfer controller may include:

a host controller which transfers data as the host during the host operation; and a peripheral controller which transfers data as the peripheral during the peripheral operation, and during the host operation, the buffer controller may allocate a plurality of pipe regions in the packet buffer, and the host controller may transfer data between one of the allocated pipe regions and an endpoint corresponding to the one of the pipe regions.

When the state of the data transfer control device controlled by the state controller changes to the state of the host operation, the host controller performs data transfer in the role of the host. When the state of the data transfer control device controlled by the state controller changes to the state of the peripheral operation, the peripheral controller performs data transfer in the role of the peripheral. This realizes the dual-role device function. The pipe regions are allocated in the packet buffer during the host operation, and data is transferred between one of the allocated pipe regions and an endpoint. This realizes the dual-role device function, and reduces the processing load of the processing section which controls the data transfer control device during the host operation.

Any of these data transfer control devices may perform data transfer conforming to a Universal Serial Bus (USB) On-The-Go (OTG) standard.

With any of these data transfer control devices, issuance of the retransmission transaction or the reissuance the token may be allowed after waiting for the predetermined skip timing when a control transfer or a bulk transfer is performed.

A further embodiment of the present invention provides an electronic instrument including:

any one of the above data transfer control devices;

a device which performs output processing, fetch processing or storage processing of data transferred through the data transfer control device and the bus; and a processing section which controls data transfer of the data transfer control device.

A still further embodiment of the present invention provides a data transfer control method for data transfer through a bus, the data transfer control method including:

issuing a transaction for performing data transfer with a transfer destination; and allowing issuance of a retransmission transaction for a negative acknowledgment (NAK) response after waiting for a predetermined skip timing, when the NAK response to the issued transaction is returned from the transfer destination.

A yet further embodiment of the present invention provides a data transfer control method for data transfer through a bus, the data transfer control method including:

issuing a token to an endpoint of a peripheral; and allowing reissuance of the token after waiting for a predetermined skip timing when a negative acknowledgment (NAK) response corresponding to the token is returned from the peripheral at least once.

1. Simple Host 1.1 A-Device and B-Device

The USB On-The-Go (OTG) standard is briefly described below as an example of a standard which realizes the simple host. However, the method of the present invention is not limited to the data transfer control method of the OTG standard.

In the OTG standard, a Mini A-plug and a Mini B-plug shown in FIG. 1A are defined as the connector standard. The OTG standard defines a Mini-AB receptacle as a connector to which the Mini A-plug and the Mini B-plug can be connected.

Figure 1B:
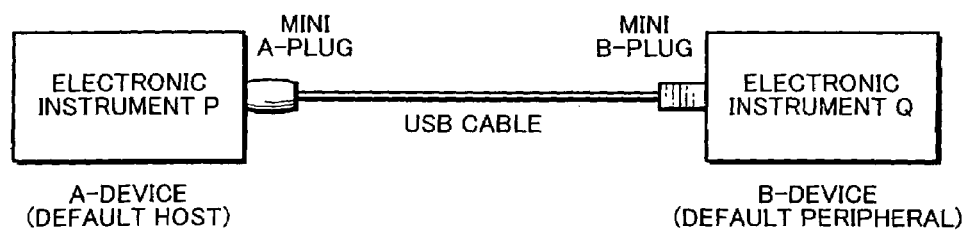
Figure 1C:
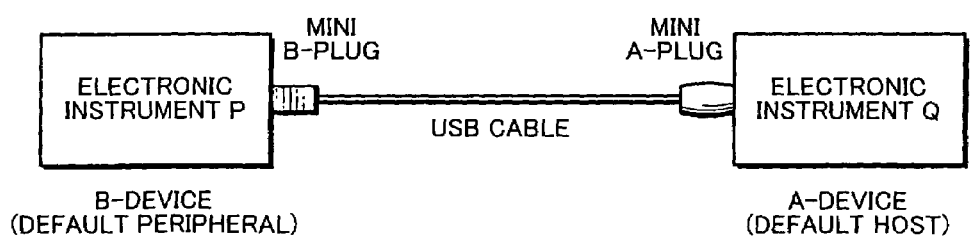

As shown in FIG. 1B, when an electronic instrument P is connected with the Mini A-plug of the USB cable and an electronic instrument Q is connected with the Mini B-plug, the electronic instruments P and Q are respectively assigned to an A-device and a B-device. As shown in FIG. 1C, when the Mini B-plug and the Mini A-plug are respectively connected with the electronic instruments P and Q, the electronic instruments P and Q are respectively assigned to a B-device and an A-device. The electronic instrument determines whether it is connected with either type of plug by detecting the voltage level of the ID pin of the Mini A-plug or the Mini B-plug.

In the OTG standard, the A-device (master) provides a power supply (VBUS) (supplier), and the B-device (slave) receives the power supply (receiver). The A-device becomes the host in a default state, and the B-device becomes the peripheral (peripheral device) in a default state.

1.2 Dual-Role Device

The OTG standard defines a dual-role device which can have the role of the host (simple host) and the role of the peripheral.

The dual-role device can become either a host or a peripheral. In the case where a device connected with the dual-role device is the host or the peripheral (device) in the conventional USB standard, the role of the dual-role device is determined uniquely. Specifically, the dual-role device is assigned to the peripheral when the connection partner is the host, and the dual-role device is assigned to the host when the connection partner is the peripheral. When the connection partner is a dual-role device, the dual-role devices can exchange the role of the host and the role of the peripheral.

The dual-role device has a function of Session Request Protocol (SRP) and a function of Host Negotiation Protocol (HNP). SRP is a protocol which allows the B-device to request the A-device to provide VBUS (power supply). HNP is a protocol for exchanging the role of the host and the role of the peripheral.

Specifically, when the dual-role devices are connected as described above, the A-device to which the Mini A-plug is connected becomes a default host, and the B-device to which the Mini B-plug is connected becomes a default peripheral. In the OTG standard, the role of the host and the role of the peripheral can be exchanged without plugging and unplugging. HNP is the protocol for realizing the role exchange.

2. Transaction

In the USB standard, the host schedules data transfers in transaction units. In more detail, the host schedules one or more transactions in time units of one frame. A frame is started when the host issues a start of frame (SOF) packet. In the FS mode and the LS mode, one frame is one millisecond (ms). In the HS mode, one (micro) frame is defined in units of 125 ms.

As data transfer types, a bulk transfer, an interrupt transfer, a control transfer, and an isochronous transfer are defined. A transaction is a unit which makes up each transfer. A bulk transfer is non-periodic and is used to transfer large bursty data which can be delayed, for example. An interrupt transfer is used to transfer a small amount of data with a low transfer frequency, for example. A control transfer is used for the host to read the configuration of the peripheral (device), for example. An isochronous transfer is periodic and is used to transfer isochronous data, for example.

In a transaction, a token packet, an optional data packet, and an optional handshake packet are transferred between the host and the peripheral. A transaction starts to be issued when the host transmits a token packet.

FIGS. 2A, 2B, 2C, and 2D show explanatory diagrams of transactions of a bulk transfer. FIG. 2A shows a transaction when the transfer direction is the IN direction and the transfer is normally completed. FIG. 2B shows a transaction when the transfer direction is the IN direction and the transfer is not normally completed. FIG. 2C shows a transaction when the transfer direction is the OUT direction and the transfer is normally completed. FIG. 2D shows a transaction when the transfer direction is the OUT direction and the transfer is not normally completed.

A bulk transfer is divided into three phases consisting of a token phase, a data phase, and a handshake phase. A packet specified in the USB standard is transferred in each phase. The USB packet starts with a SYNC field and ends with an end-of-packet (EOP).

When the transfer direction is the IN direction, the host issues an IN token (packet) to the peripheral in the token phase to start issuing an IN transaction (FIGS. 2A and 2B). In the data phase, when the peripheral which has received the IN token from the host is ready for data transmission, the peripheral transmits IN data (packet) (FIG. 2A). When the peripheral is not ready for data transmission in the data phase, the peripheral transmits a negative acknowledgment (NAK) handshake packet to the host, and waits for the host to reissue the IN transaction (FIG. 2B). The host detects a NAK response by receiving the NAK handshake packet to detect that the data transfer has not been normally completed. Data DATA0/DATA1 in the data phase is identified by the packet ID (PID). Occurrence of errors can be detected by alternately utilizing the data DATA0/DATA1.

The host which has normally received the IN data from the peripheral in the data phase transmits a positive acknowledgment (ACK) handshake packet (ACK response) to the peripheral (FIG. 2A). The peripheral determines that the data transfer has been normally completed by receiving the ACK response.

When the transfer direction is the OUT direction, the host issues an OUT token (packet) to the peripheral in the token phase to start issuing an OUT transaction (FIGS. 2C and 2D). In the data phase, the host transmits OUT data (packet) to the peripheral subsequent to the OUT token (FIGS. 2C and 2D).

The peripheral which has normally received the OUT data in the data phase transmits an ACK handshake packet (ACK response) in the handshake phase (FIG. 2C). The host determines that the data transfer has been normally completed by receiving the ACK response. When the peripheral is not ready for data reception and cannot receive the OUT data in the data phase, the peripheral transmits a NAK handshake packet (NAK response) to the host, and waits for the host to reissue the OUT transaction (FIG. 2B).

A transaction of an interrupt transfer is the same as the transaction of a bulk transfer.

FIGS. 3A, 3B, and 3C show explanatory diagrams of transactions of a control transfer. FIG. 3A shows a setup transaction of a control transfer. FIG. 3B shows a control write transfer. FIG. 3C shows a control read transfer.

A control transfer includes a setup stage and a status stage, and includes an optional data stage between the setup stage and the status stage (FIGS. 3B and 3C).

In the setup stage, a setup transaction shown in FIG. 3A is issued. In the token phase, the host issues a SETUP token (packet) to the peripheral to start issuing the setup transaction. In the data phase, the host transmits data (packet) to the peripheral subsequent to the SETUP token.

The peripheral which has normally received the data in the data phase transmits an ACK handshake packet (ACK response) in the handshake phase (FIG. 3A). The host determines that the data transfer has been normally completed by receiving the ACK response. When the peripheral is not ready for data reception and cannot receive the data in the data phase, the peripheral discards the received data, and does not transmit a handshake packet.

In the data stage after the setup stage, one or more OUT transactions or one or more IN transactions are issued. In a control write transfer, data is transmitted to the peripheral from the host by repeating OUT transactions one or more times (FIG. 3B). In a control read transfer, data is transmitted to the host from the peripheral by repeating IN transactions one or more times (FIG. 3C). The OUT transaction in the data stage is the same as the OUT transaction of the bulk transfer. The IN transaction in the data stage is the same as the IN transaction of the bulk transfer.

The status stage after the data stage is the final transaction. In the case of a control write transfer, an IN transaction is issued in the status stage. The host waits for the peripheral to finish processing by the IN transaction. The IN transaction is the same as the IN transaction of the bulk transfer. In the case of a control read transfer, an OUT transaction is issued in the status stage. The host can confirm that the processing has finished by the OUT transaction. The OUT transaction is the same as the OUT transaction of the bulk transfer.

Figure 4A:
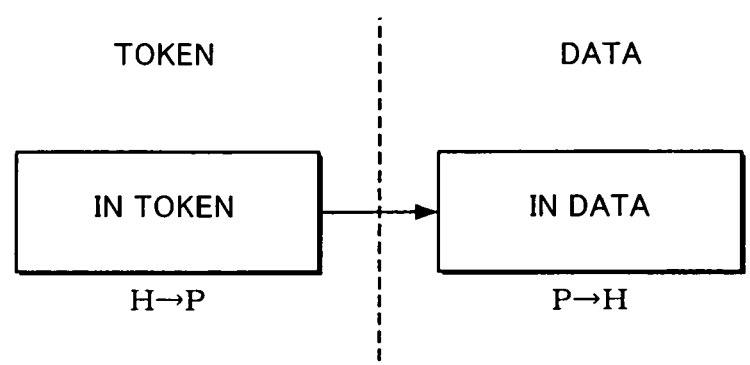
FIGS. 4A and 4B are illustrative of transactions of an isochronous transfer.
Figure 4B:
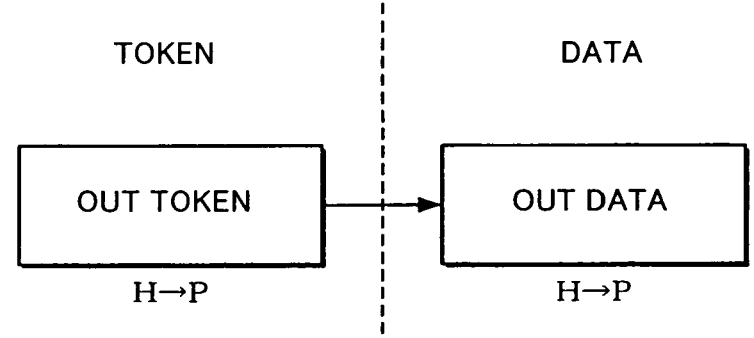

FIGS. 4A and 4B show explanatory diagrams of transactions of an isochronous transfer. FIG. 4A shows an IN transaction of an isochronous transfer. FIG. 4B shows an OUT transaction of an isochronous transfer.

When the transfer direction is the IN direction, the host issues an IN token (packet) to the peripheral in the token phase to start issuing an IN transaction (FIG. 4A). In the data phase, the peripheral which has received the IN token from the host transmits IN data (packet) (FIG. 4A).

When the transfer direction is the OUT direction, the host issues an OUT token (packet) to the peripheral in the token phase to start issuing an OUT transaction (FIG. 4B). In the data phase, the host transmits OUT data (packet) to the peripheral subsequent to the OUT token (FIG. 4B).

As described above, the isochronous transfer includes the token phase and the data phase, but does not include the handshake phase. Therefore, the isochronous transfer cannot allow the host or the peripheral to know that the data transfer has been normally completed.

2.1 Comparative Example

In the bulk transfer, control transfer, and interrupt transfer which include the handshake phase, it is necessary to issue a retransmission transaction when a NAK response is returned for the issued transaction. Therefore, if the retransmission transaction is continuously issued until an ACK response is returned, a large number of retransmission transactions may be issued for the NAK response within a frame.

Figure 5:
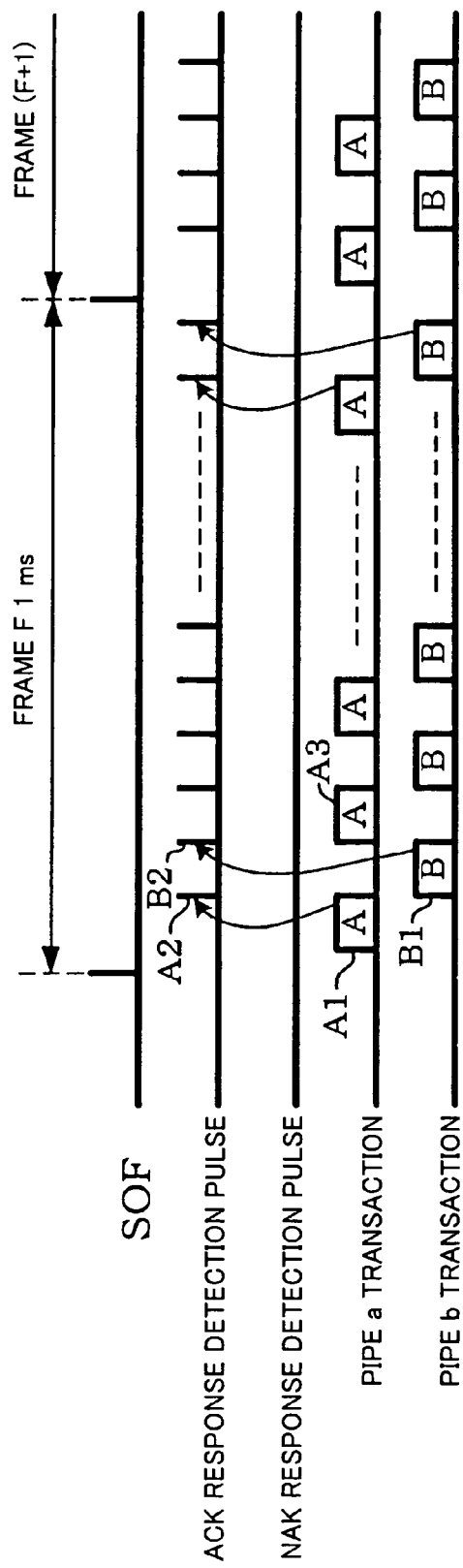
FIG. 5 is a timing diagram in the case where an ACK response is returned for a transaction.

FIG. 5 shows a timing diagram when only an ACK response is returned for the issued transaction. In FIG. 5, two pipes a and b, which are either a control transfer or a bulk transfer, are set up in the FS mode, and conditions such as the maximum packet size are simply and schematically illustrated.

A frame is specified by an SOF packet issued by the host at an interval of 1 ms. In a frame F, the host issues a transaction A1 of the pipe a. When an ACK response is returned for the transaction A1 of the pipe a, the host generates an ACK response detection pulse A2. The ACK response is returned by allowing the host to transmit an ACK handshake packet to the peripheral in the IN transaction, or allowing the peripheral to transmit an ACK handshake packet to the host in the OUT transaction.

The host then issues a transaction B1 of the pipe b. When an ACK response is returned for the transaction B1 of the pipe b, the host generates an ACK response detection pulse B2. The host then issues a transaction A3 of the pipe a. The transaction A3 of the pipe a follows the transaction A1 of the pipe a. A transaction of the pipe b is issued in the same manner as for the pipe a. Subsequently, transactions of the pipes a and b are alternately issued, whereby the band of one frame can be effectively used.

FIGS. 6A and 6B show timing diagrams when a NAK response is returned for the issued transaction. In FIGS. 6A and 6B, two pipes a and b, which are either a control transfer or a bulk transfer, are set up in the FS mode, and conditions such as the maximum packet size are simply and schematically illustrated in the same manner as in FIG. 5.

FIG. 6A shows the case where a NAK response is returned for a transaction of the pipe a, and the retransmission transactions of the current transaction are repeatedly issued.

In the frame F, the host issues a transaction A11 of the pipe a. When a NAK response is returned for the transaction A11 of the pipe a, the host generates a NAK response detection pulse A12. The NAK response is returned by allowing the peripheral to transmit a NAK handshake packet to the host in the IN transaction or the OUT transaction.

The host then reissues a transaction A13 for which the NAK response has been returned as a retransmission transaction. When a NAK response is returned for the transaction A13, the host generates a NAK response detection pulse A14, and then repeatedly issues the retransmission transactions. As a result, the band in the frame F is occupied by the transactions of the pipe a. Therefore, a transaction of the pipe b cannot be issued until the transaction of the pipe a is completed by an ACK response.

FIG. 6B shows the case where a NAK response is returned for a transaction of the pipe a, and a retransmission transaction of the pipe a is issued after issuing a transaction of the pipe b when a transfer request for the pipe b exists.

In the frame F, the host issues a transaction A21 of the pipe a. When a NAK response is returned for the transaction A21 of the pipe a, the host generates a NAK response detection pulse A22. In this case, the host issues a transaction B21 of the pipe b when a transfer request for the pipe b exists. When an ACK response is returned for the transaction B21 of the pipe b, the host generates an ACK response detection pulse B22. The host then issues a transaction A23 of the pipe a as the retransmission transaction of the transaction A21. When a NAK response is returned for the transaction A23, the host generates a NAK response detection pulse A24. Subsequently, the host repeatedly issues retransmission transactions of the pipe a and transactions of the pipe b until an ACK response is returned for the transaction of the pipe a. As a result, although use efficiency of the band can be increased in comparison with the case shown in FIG. 6A, the band in the frame is uselessly used by the retransmission transaction of the pipe a.

As described above, the limited band is uselessly used by issuing the retransmission transaction corresponding to the NAK response returned for the issued transaction, whereby the transfer efficiency is decreased and unnecessary electric power is consumed by issuing the retransmission transaction.

3. Method in Present Embodiment

In this embodiment, on condition that a retransmission transaction is issued when a NAK response is returned for the issued transaction, issuance of the retransmission transaction is allowed after waiting for a predetermined skip point (skip timing). This prevents the retransmission transaction from being issued in a period between the timing at which the NAK response is returned and a predetermined skip point. The retransmission transaction can be immediately issued after a predetermined skip point has been passed if another transfer is not performed. If another transfer is performed, the retransmission transaction can be issued after the transfer has been completed.

In this embodiment, on condition that the retransmission transaction for the NAK response has been issued one or more times, issuance of the next retransmission transaction may be allowed after waiting for a predetermined skip timing. Specifically, instead of issuing the retransmission transaction after a predetermined skip point when the NAK response is returned for the transaction once, after issuing the retransmission transaction corresponding to the NAK response at least once, the retransmission transaction corresponding to the last NAK response may be issued after a predetermined skip point. This may enable transfer with a transfer destination which has become ready for transfer immediately after the NAK response to be realized by the next retransmission transaction.

In this embodiment, in the case where a transaction is started by issuing a token as in the USB standard, when a NAK response is returned from the transfer destination (peripheral) at least once corresponding to the token, reissuance of the token is allowed after waiting for a predetermined skip point (skip timing).

The skip point may be provided in frame units, or a plurality of skip points may be provided within a frame.

FIG. 7 shows an explanatory diagram in the case where the skip point is provided in frame units in this embodiment. For example, the skip point is provided at an issue timing of an SOF packet. When a NAK response to a transaction C1 issued in the frame F is returned from the transfer destination (peripheral), the host generates a NAK response detection pulse C2. The host waits for the next skip point without issuing a retransmission transaction C3 even if another transfer request does not exist, and issues a retransmission transaction C4. In more detail, the host waits for a skip point SP1 in the frame (F+1), and issues the retransmission transaction C4 after issuance of the retransmission transaction C4 has been allowed. The skip point SP1 may be referred to as a point within a period of the frame (F+1) subsequent to the frame F in which the NAK response is returned.

In the case where a transaction is started by issuing a token, the host issues a token to an endpoint of the peripheral in order to issue the transaction C1, and generates the NAK response detection pulse C2 when a NAK response is returned from the peripheral corresponding to the token. The host waits for the next skip point without issuing a token for the retransmission transaction C3 even if another transfer request does not exist, and reissues a token for the retransmission transaction C4. In more detail, the host waits for the skip point SP1 in the frame (F+1), and issues a token after reissuance of the token for issuing the retransmission transaction C4 has been allowed. The skip point SP1 may be referred to as a point within a period of the frame (F+1) subsequent to the frame F in which the token is issued.

The above description illustrates the case where the host issues the retransmission transaction when the NAK response is returned once for the issued transaction C1. However, on condition that the host has issued the retransmission transaction corresponding to the NAK response to the transaction C1 one or more times, the host may wait for the skip point SP1 and allow issuance of the retransmission transaction. The host may wait for the skip point SP1 and allow reissuance of the token for issuing the retransmission transaction on condition that the NAK response has been returned from the peripheral two or more times corresponding to the token.

In FIG. 7, the skip point is provided at the issue timing of the SOF packet. However, the skip timing may be provided at an arbitrary timing within a frame.

Figure 8:
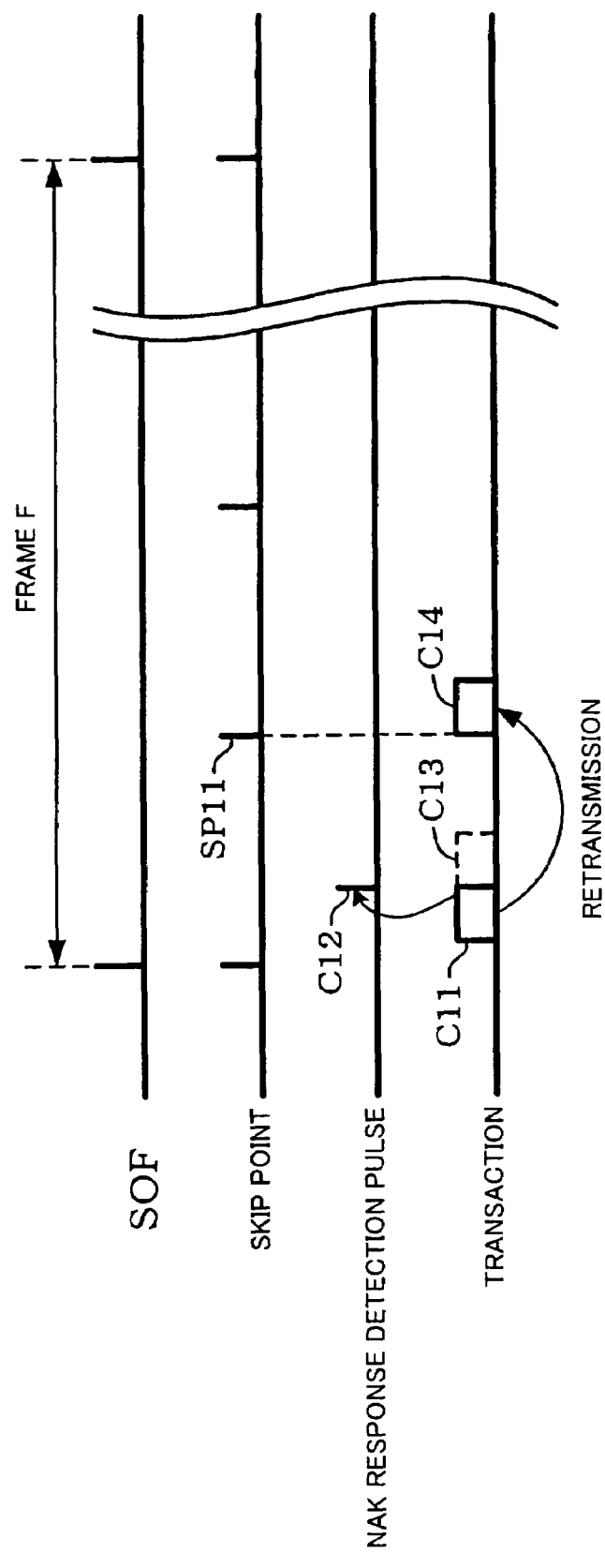
FIG. 8 is illustrative of the case where a plurality of skip points are provided in a frame in an embodiment of the present invention.

FIG. 8 shows an explanatory diagram in the case where a plurality of skip points are provided within a frame. N skip points (N is a positive integer) are provided within a frame. The case where N is one corresponds to the case where the skip point is provided in frame units as shown in FIG. 7. Therefore, N is a plural number in FIG. 8.

When a NAK response to a transaction C11 issued in the frame F is returned from the transfer destination (peripheral), the host generates a NAK response detection pulse C12. The host waits for the next skip point without issuing a retransmission transaction C13 even if another transfer request does not exist, and issues a retransmission transaction C14. In more detail, the host waits for a skip point SP11, and, after issuance of the retransmission transaction C14 has been allowed, issues the retransmission transaction C14 if another transfer request does not occur (or transfer request with higher priority does not exist) at the skip point SP11. The skip point SP11 may be referred to as the first skip timing after the transaction C11 has been issued.

In the case where a transaction is started by issuing a token, the host issues a token to an endpoint of the peripheral in order to issue the transaction C11, and generates the NAK response detection pulse C12 when a NAK response is returned from the peripheral corresponding to the token. The host waits for the next skip point without issuing a token for the retransmission transaction C13 even if another transfer request does not exist, and reissues a token for the retransmission transaction C14. In more detail, the host waits for the skip point SP11, and, after issuance of the token for the retransmission transaction C14 has been allowed, issues the token if another transfer request does not exist (or transfer request with higher priority does not exist) at the skip point SP11. The skip point SP11 may be referred to as the first skip point after the token for issuing the transaction C11 has been issued, or may be referred to as the first skip point after the NAK response has been returned corresponding to the token.

The above description illustrates the case where the host issues the retransmission transaction when the NAK response is returned once for the issued transaction C1 as shown in FIG. 8. However, the host may wait for the skip point SP11 and allow issuance of the retransmission transaction on condition that the host has issued the retransmission transaction corresponding to the NAK response to the transaction C11 one or more times. The host may wait for the skip point SP11 and allow reissuance of the token for issuing the retransmission transaction on condition that the NAK response has been returned from the peripheral two or more times corresponding to the token.

The case where N is four and a NAK response is returned for a transaction in this embodiment is described below.

Figure 9:
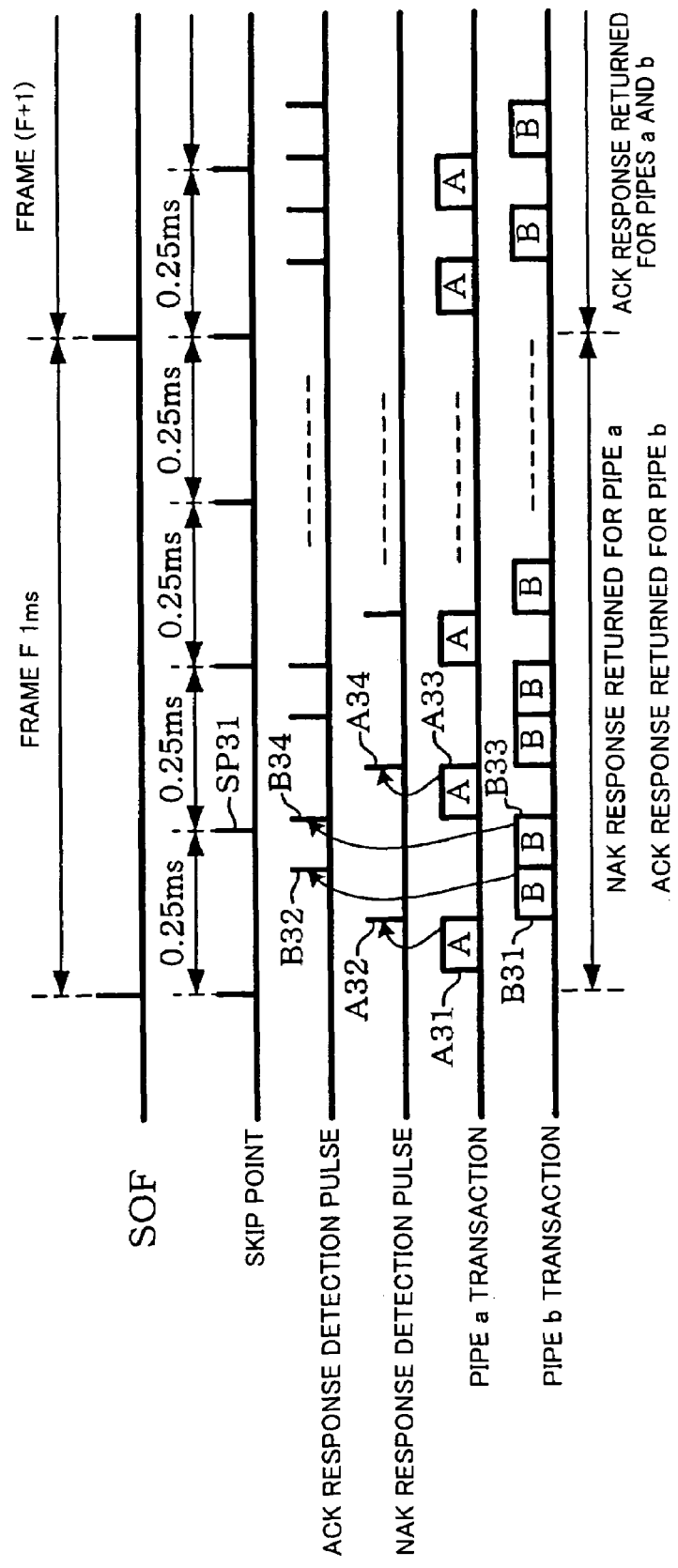
FIG. 9 shows an example of a timing in the case where a NAK response is returned for a transaction in an embodiment of the present invention.

FIG. 9 shows an example of a timing diagram in the case where a NAK response is returned for a transaction in this embodiment. In FIG. 9, two pipes a and b, which are either a control transfer or a bulk transfer, are set up in the FS mode, and conditions such as the maximum packet size are simply and schematically illustrated. FIG. 9 shows the case where a NAK response is returned for a transaction of the pipe a and an ACK response is returned for a transaction of the pipe b in the frame F, and ACK responses are returned for transactions of the pipes a and b in the frame (F+1).

In the frame F, the host issues a transaction A31 of the pipe a. When a NAK response is returned for the transaction A31 of the pipe a, the host generates a NAK response detection pulse A32. When a transfer request for the pipe b exists, the host issues a transaction B21 of the pipe b, and reissues the transaction A31 after the skip point SP31.

When an ACK response is returned for the transaction B31 of the pipe b, the host generates an ACK response detection pulse B32. The host then issues the next transaction. In this case, since the skip point SP31 has not been passed when the transaction B31 is completed, the host issues a transaction B33 of the pipe b. When an ACK response is returned for the transaction B33 of the pipe b, the host generates an ACK response detection pulse B34.

If the skip point SP31 has been passed at this time, the host issues a transaction A33 of the pipe a as the retransmission transaction of the transaction A31. When a NAK response is returned for the transaction A33, the host generates a NAK response detection pulse A34. Subsequently, the host repeatedly issues retransmission transactions of the pipe a and transactions of the pipe b until an ACK response is returned for the transaction of the pipe a.

As described above, since the band is also assigned to the pipe b in FIG. 9 while issuing the retransmission transaction of the pipe a, the band can be effectively used.

Figure 10:
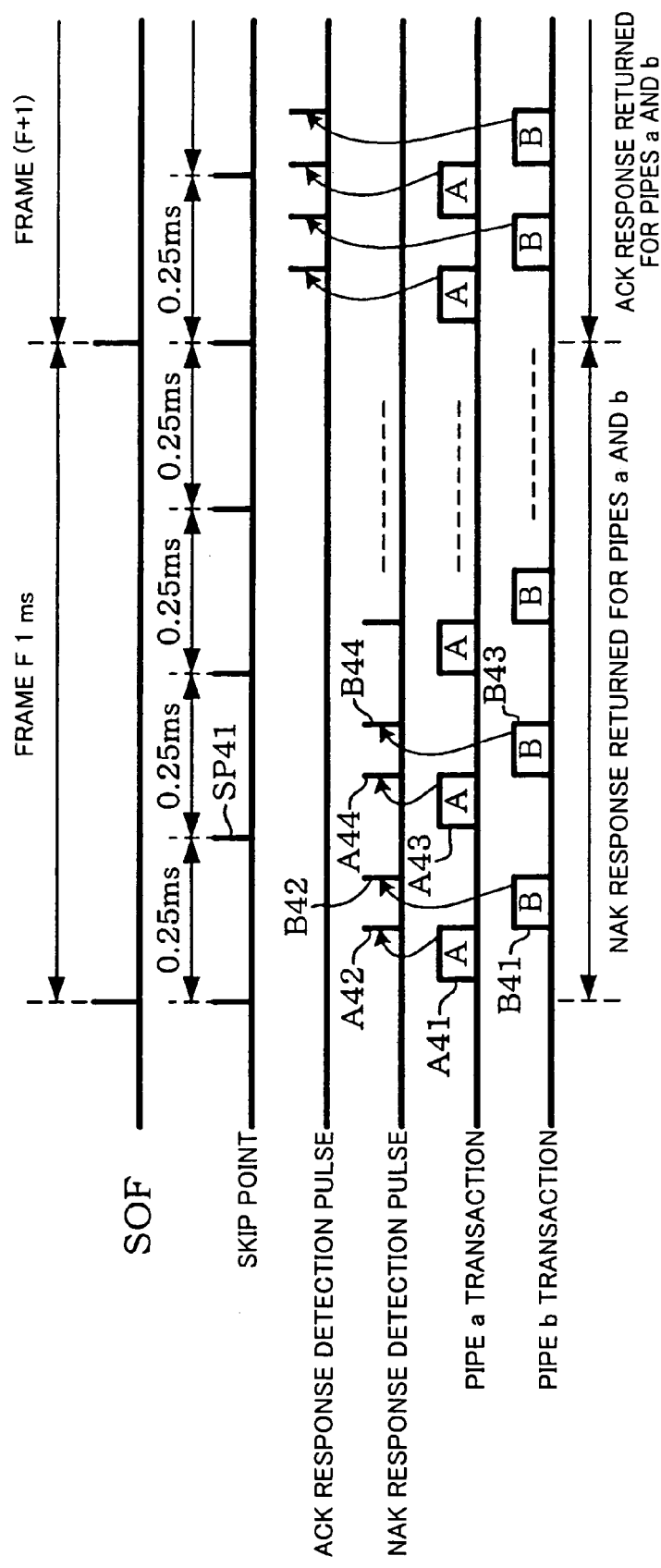
FIG. 10 shows another example of a timing in the case where a NAK response is returned for a transaction in an embodiment of the present invention.

FIG. 10 shows another example of a timing diagram of the case where a NAK response is returned for a transaction in this embodiment. In FIG. 10, two pipes a and b, which are either a control transfer or a bulk transfer, are set up in the FS mode, and conditions such as the maximum packet size are simply and schematically illustrated. FIG. 10 shows an example in which NAK responses are returned for transactions of the pipes a and b in the frame F, and ACK responses are returned for transactions of the pipes a and b in the frame (F+1).

In the frame F, the host issues a transaction A41 of the pipe a. When a NAK response is returned for the transaction A31 of the pipe a, the host generates a NAK response detection pulse A42. When a transfer request for the pipe b exists, the host issues a transaction B41 of the pipe b, and reissues the transaction A41 after the skip point SP41 has been passed.

When a NAK response is returned for the transaction B31 of the pipe b, the host generates a NAK response detection pulse B42. In this case, the host reissues the transaction B41 after the skip point SP41 has been passed.

Therefore, retransmission transactions of the pipes a and b are not issued until the skip point SP41 is passed. If a transfer request for another pipe occurs during this period, a transaction of this transfer can be issued.

After the skip point SP41 has been passed, the host issues a transaction A43 of the pipe a as the retransmission transaction of the transaction A41. The host then issues a transaction B43 of the pipe b as the retransmission transaction of the transaction B41. Subsequently, the host repeatedly issues retransmission transactions of the pipes a and b until ACK responses are returned for the transactions of the pipes a and b.

As described above, since occurrence of an unnecessary transaction accompanying a NAK response is prevented in FIG. 10, power consumption can be reduced.

A configuration example of a data transfer control device which issues a retransmission transaction or reissues a token is described below.

3.1 Data Transfer Control Device 3.1.1 Configuration Example

Figure 11:
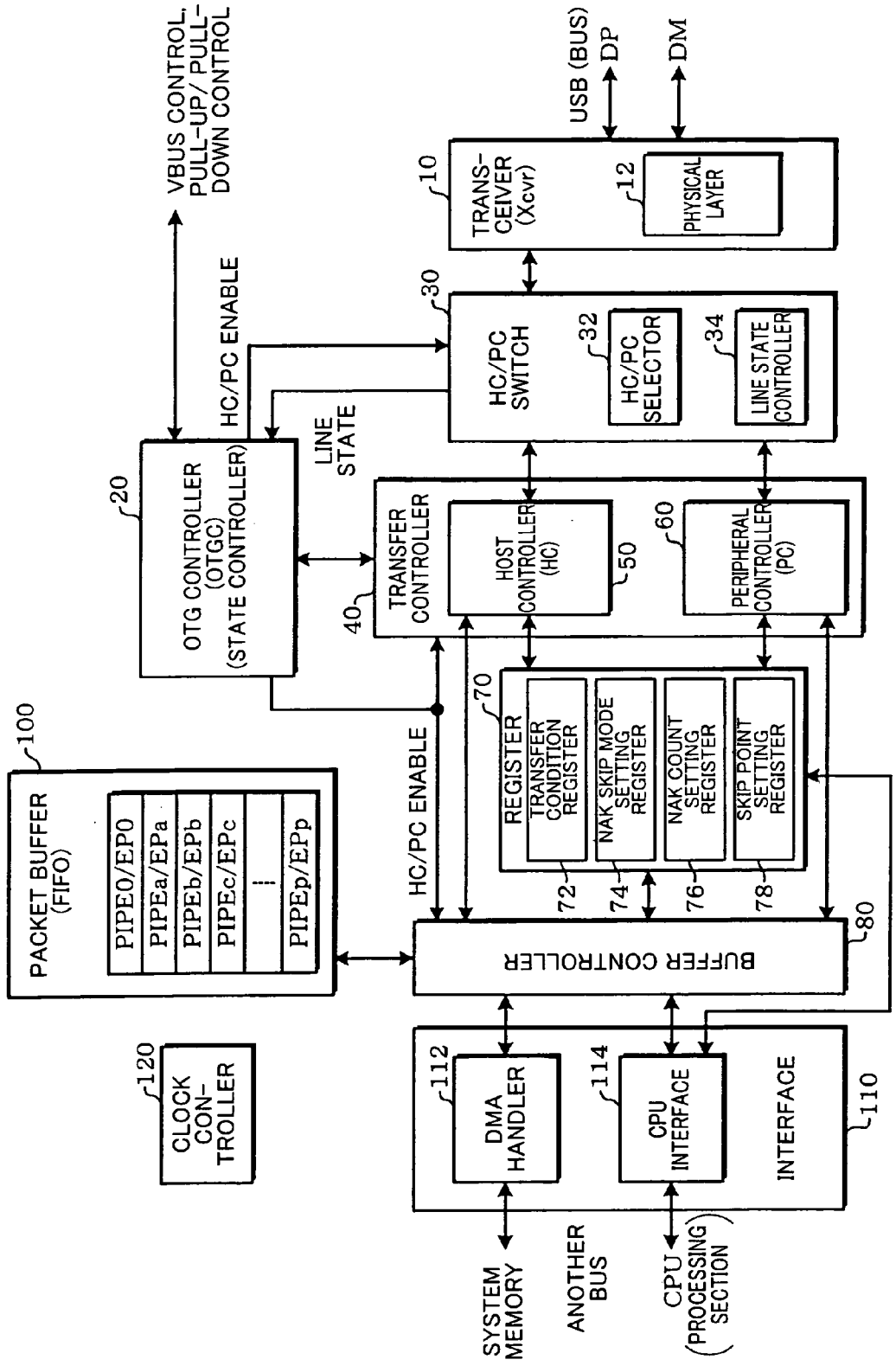
FIG. 11 is a block diagram of a configuration example of a data transfer control device in an embodiment of the present invention.

FIG. 11 shows a configuration example of a data transfer control device (data transfer control circuit) in this embodiment. The data transfer control device in this embodiment may have a configuration in which some of the functional blocks shown in FIG. 11 are omitted. The functional blocks shown in FIG. 11 may be realized by only a hardware circuit, or may be realized by a hardware circuit and firmware (software). The case where the present invention is applied to a data transfer control device conforming to the OTG standard is described below. However, the present invention may be applied to a data transfer control device conforming to a standard developed from the OTG standard, or to a data transfer control device which does not conform to the OTG standard. For example, the present invention may be applied to a data transfer control device which does not have the function of the dual-role device and has only the function of the simple host.

The data transfer control device shown in FIG. 11 performs control conforming to the OTG standard. Therefore, a transaction is issued by issuing a token.

The data transfer control device includes a transceiver (hereinafter appropriately called "Xcvr") 10. The transceiver 10 is a circuit which transmits and receives USB data by using signals of data signal lines DP and DM which make up a differential pair. The transceiver 10 includes a USB physical layer (PHY) circuit 12. In more detail, the transceiver 10 performs generation of the line state (J, K, SE0, or the like) of the data signal lines DP and DM, serial/parallel conversion, parallel/serial conversion, bit stuffing, bit unstuffing, NRZI decoding, NRZI encoding, and the like. The transceiver 10 may be provided outside the data transfer control device.

The data transfer control device includes an OTG controller (state controller in a broad sense; hereinafter appropriately called "OTGC") 20. The OTG controller 20 performs processing for realizing the SRP function and the HNP function in the OTG standard. Therefore, the OTG controller 20 controls a plurality of states including a state of a host operation which operates in the role of a host, a state of a peripheral operation which operates in the role of a peripheral, and the like.

In more detail, the OTG standard defines a state transition of the dual-role device when assigned to the A-device and a state transition of the dual-role device when assigned to the B-device. The OTG controller 20 has the function of a state machine which realizes the state transition. The OTG controller 20 includes a circuit which detects (monitors) the USB line state, VBUS level, and ID pin state. The OTG controller 20 changes the state (state such as host, peripheral, suspend, or idle) based on the detected state. The state transition in this case may be realized by a hardware circuit, or may be realized by allowing firmware to set a state command in a register. When the state transition occurs, the OTG controller 20 controls the power supply VBUS or performs pull-up control or pull-down control of the data signal lines DP and DM corresponding to the state after transition. The OTG controller 20 controls enabling/disabling of a host controller (hereinafter appropriately called "HC") 50 and a peripheral controller (hereinafter appropriately called "PC") 60.

The data transfer control device includes an HC/PC switch circuit (HC/PC common circuit) 30. The HC/PC switch circuit 30 controls switching of connection between the transceiver 10 and the host controller 50 or the peripheral controller 60. The HC/PC switch circuit 30 directs the transceiver 10 to generate the line state of the USB data signal lines DP and DM. The connection switch control is realized by an HC/PC selector 32, and the direction for line state generation is realized by a line state controller 34.

For example, when the OTG controller 20 activates an HC enable signal (HC_Enable) during the host operation, the HC/PC switch circuit 30 (HC/PC selector 32) connects the transceiver 10 with the host controller 50. When the OTG controller 20 activates a PC enable signal (PC_Enable) during the peripheral operation, the HC/PC switch circuit 30 connects the transceiver 10 with the peripheral controller 60.

This causes the host controller 50 and the peripheral controller 60 to be operated exclusively.

The data transfer control device includes a transfer controller 40. The transfer controller 40 is a circuit which controls data transfer through the USB, and includes the host controller (HC) 50 and the peripheral controller (PC) 60. In the case of realizing only the simple host function, the peripheral controller 60 may not be included in the transfer controller 40.

The host controller 50 is a circuit which controls data transfer in the role of the host during the host operation. Specifically, the host controller 50 is connected with the transceiver 10 by the HC/PC switch circuit 30 during the host operation. The host controller 50 (automatically) generates a transaction to an endpoint based on transfer condition information set in a transfer condition register section 72 of a register section 70. The host controller 50 automatically transfers data (packet) (data transfer by a hardware circuit in which a processing section does not take part) between pipe regions (PIPE 0 to PIPE p; hereinafter may be called "PIPE") allocated in a packet buffer 100 and endpoints corresponding to the pipe regions.

In more detail, the host controller 50 performs arbitration between pipe transfers, time management in a frame, transfer scheduling, retransmission management, and the like. The host controller 50 manages transfer condition information (operation information) of pipe transfers through the register section 70. The host controller 50 manages transactions, assembles or disassembles packets, and directs generation of a suspend state, resume state, or reset state. In this embodiment, the host controller 50 (transfer controller 40 in a broad sense) issues a transaction or a token, and allows issuance of a retransmission transaction corresponding to a NAK response to the issued transaction or reissuance of a token after waiting for a predetermined skip point (this operation is hereinafter appropriately called "NAK skip").

The peripheral controller 60 is a circuit which controls data transfer in the role of a peripheral during the peripheral operation. Specifically, the peripheral controller 60 is connected with the transceiver 10 by the HC/PC switch circuit 30 during the peripheral operation. The peripheral controller 60 transfers data between endpoint regions (EP 0 to EP p, hereinafter may be called "EP") allocated in the packet buffer 100 and the host based on the transfer condition information set in the transfer condition register section 72 of the register section 70.

In more detail, the peripheral controller 60 manages the transfer condition information (operation information) of endpoint transfers through the register section 70. The peripheral controller 60 manages transactions, assembles or disassembles packets, and directs generation of a remote wakeup signal.

The endpoint is a point (portion) on a peripheral (device) to which a unique address can be assigned. All the data transfers between the host and the peripheral (device) are performed through the endpoints.

The data transfer control device includes the register section 70. The register section 70 includes various registers for performing data transfer (pipe transfer or endpoint transfer) control, buffer access control, buffer management, interrupt control, block control, clock control, DMA control, and the like. The registers may be realized by a memory such as a random access memory (RAM), or may be realized by D flip-flops or the like. The registers of the register section 70 may not be positioned together, and may be dispersed in each block (HC, PC, OTGC, Xcvr, and the like).

The register section 70 includes the transfer condition register section 72. The transfer condition register section 72 includes registers which store the transfer condition information on data transfers between the pipe regions (PIPE 0 to PIPE p) allocated in the packet buffer 100 during the host operation and the endpoints. The transfer condition register is provided corresponding to each pipe region of the packet buffer 100.

The endpoint regions (EP 0 to EP p) are allocated in the packet buffer 100 during the peripheral operation. Data is transferred between the data transfer control device and the host based on the transfer condition information set in the transfer condition register section 72.

The register section 70 includes a NAK skip mode setting register section 74 (skip mode setting register). The NAK skip mode setting register section 74 is a register for setting the NAK skip mode in the ON state (enabled) or the OFF state (disabled) by a hardware circuit or firmware (software). When the ON set value is set in the NAK skip mode setting register section 74, the NAK skip mode is enabled. When the OFF set value is set in the NAK skip mode setting register section 74, the NAK skip mode is disabled.

When the NAK skip mode is enabled, the host controller 50 performs the NAK skip operation as described with reference to FIGS. 7 to 10. When the NAK skip mode is disabled, a retransmission transaction corresponding to a NAK response is immediately issued (NAK skip operation is not performed), as shown in FIGS. 6A and 6B.

It is preferable that the NAK skip mode setting register section 74 enable or disable the NAK skip mode for each endpoint of the peripheral. However, the present invention is not limited thereto. The NAK skip mode setting register section 74 may enable or disable the NAK skip mode in common for a plurality of pipes, for example.

The register section 70 includes a NAK count setting register section 76. The NAK count setting register section 76 is a register for setting the number of NAK responses by a hardware circuit or firmware (software). The host controller 50 performs the above-described NAK skip operation for the next retransmission transaction on condition that the host controller 50 has issued the retransmission transactions corresponding to the NAK response a number of times corresponding to the value set in the NAK count setting register section 76 in a state in which the NAK skip mode is enabled.

It is preferable that the number of NAK responses be set in the NAK count setting register section 76 for each endpoint of the peripheral. However, the present invention is not limited thereto. The number of NAK responses may be set in the NAK count setting register section 76 in common for a plurality of pipes, for example.

The register section 70 includes a skip point setting register section 78 (skip timing setting register). The skip point setting register section 78 is a register for setting one or more skip points in a frame by a hardware circuit or firmware (software).

It is preferable that the skip point be set in the skip point setting register section 78 for each endpoint of the peripheral. However, the present invention is not limited thereto. The skip point may be set in the skip point setting register section 78 in common for a plurality of pipes, for example.

The data transfer control device includes a buffer controller (FIFO manager) 80. The buffer controller 80 performs processing of allocating the pipe regions or the endpoint regions in the packet buffer 100. The buffer controller 80 performs access control and region management of the packet buffer 100. In more detail, the buffer controller 80 controls access from a CPU (access from the processing section), access from a DMA (access from an application layer device), and access from the USB (access from the transfer controller), arbitrates between these accesses, and generates and manages addresses necessary for these accesses.

The data transfer control device includes the packet buffer (FIFO, packet memory, or data buffer) 100. The packet buffer 100 temporarily stores (buffers) data transferred through the USB (transmission data or reception data). The packet buffer 100 may be formed by a RAM, for example. A part or the entirety of the packet buffer 100 may be provided outside the data transfer control device as an external memory.

The packet buffer 100 is used as a First-In First-Out (FIFO) for pipe transfer during the host operation. Specifically, the pipe regions PIPE 0 to PIPE p (buffer regions in a broad sense) corresponding to each endpoint of USB transfer are allocated in the packet buffer 100. Data (transmission data or reception data) transferred between each pipe region and the corresponding endpoint is stored in each of the pipe regions PIPE 0 to PIPE p.

The packet buffer 100 is used as a FIFO for endpoint transfer during the peripheral operation. Specifically, the endpoint regions EP 0 to EP p (buffer regions in a broad sense) are allocated in the packet buffer 100 during the peripheral operation. Data (transmission data or reception data) transferred between each of the endpoint regions EP 0 to EP p and the host is stored in each of the endpoint regions EP 0 to EP p.

The buffer region (region which is assigned to the pipe region during the host operation and is assigned to the endpoint region during the peripheral operation) allocated in the packet buffer 100 is assigned to a storage region in which information input first is output first (FIFO region). The pipe region PIPE 0 is a dedicated pipe region assigned to an endpoint 0 for control transfer. The pipe regions PIPE a to PIPE p are general-purpose pipe regions which can be assigned to arbitrary endpoints. In the USB transfer, the endpoint 0 is assigned to an endpoint dedicated to control transfer. Therefore, confusion by the user can be prevented or settings of the pipe regions by the user can be simplified by assigning the pipe region PIPE 0 to the pipe region dedicated to control transfer as in this embodiment. Moreover, the pipe region corresponding to the endpoint can be dynamically changed by assigning the pipe regions PIPE a to PIPE p to general-purpose pipe regions which can be assigned to arbitrary endpoints. This increases the degrees of freedom relating to pipe transfer scheduling, whereby efficiency of data transfer can be increased.

In this embodiment, a region size RSize of the buffer region is set by a maximum packet size MaxPktSize (page size in a broad sense) and a page number BufferPage (RSize=MaxPktSize×BufferPage). The transfer condition register section 72 includes a register in which the maximum packet size MaxPktSize and the page number BufferPage are set for each buffer region. This enables the region size and the page number of the buffer region to be arbitrarily set, whereby the resources of the packet buffer 100 can be efficiently used.

The data transfer control device includes an interface section 110. The interface section 110 is a section for performing data transfer between a direct memory access (DMA) bus or a CPU bus (second bus), which is another bus differing from the USB, and the packet buffer 100. The interface section 110 includes a DMA handler circuit 112 for performing DMA transfer between the packet buffer 100 and an external system memory. The interface section 110 includes a CPU interface circuit 114 for performing parallel I/O (PIO) transfer between the packet buffer 100 and an external CPU. The CPU (processing section in a broad sense) may be included in the data transfer control device.

The data transfer control device includes a clock controller 120. The clock controller 120 generates a clock signal supplied to each section of the data transfer control device based on a clock signal generated by a built-in phase locked loop (PLL) circuit.

In more detail, the clock controller 120 generates an operation clock signal in units of circuit blocks consisting of one or more functional blocks, and supplies the operation clock signal to each circuit block.

3.1.2 Pipe Region and Endpoint Region

The pipe region and the endpoint region are described below. The following description is given on the assumption that the number of pipe regions and the number of endpoint regions are six in order to simplify the description.

In this embodiment, the pipe regions PIPE 0 to PIPE e are allocated in the packet buffer 100 during the host operation, as shown in FIG. 12A. Data is transferred between each pipe region and each endpoint of the peripheral.

The meaning of the "pipe" of the pipe region in this embodiment differs to some extent from the "pipe" defined in the USB standard (a logical abstraction or a logical path representing the association between an endpoint on a device and software on a host).

As shown in FIG. 12A, the pipe regions in this embodiment are allocated in the packet buffer 100 corresponding to each endpoint region of the peripheral connected with the USB (bus). In FIG. 12A, the pipe region PIPE a corresponds to an endpoint 1 (bulk IN) of a peripheral 1, and the pipe region PIPE b corresponds to an endpoint 2 (bulk OUT) of the peripheral 1. The pipe region PIPE c corresponds to an endpoint 1 (bulk IN) of a peripheral 2, and the pipe region PIPE d corresponds to an endpoint 2 (bulk OUT) of the peripheral 2. The pipe region PIPE e corresponds to an endpoint 1 (interrupt IN) of a peripheral 3. The pipe region PIPE 0 is a pipe region dedicated to an endpoint 0 for control transfer.

In the example shown in FIG. 12A, a bulk IN transfer in the USB standard is performed between the pipe region PIPE a and the endpoint 1 of the peripheral 1, and a bulk OUT transfer is performed between the pipe region PIPE b and the endpoint 2 of the peripheral 1. A bulk IN transfer is performed between the pipe region PIPE c and the endpoint 1 of the peripheral 2, and a bulk OUT transfer is performed between the pipe region PIPE d and the endpoint 2 of the peripheral 2. An interrupt IN transfer is performed between the pipe region PIPE e and the endpoint 1 of the peripheral 3. As described above, in this embodiment, an arbitrary data transfer (isochronous transfer, bulk transfer, or interrupt transfer) can be performed between the (general-purpose) pipe region and the corresponding endpoint.

In this embodiment, data in a given data unit (data unit designated by the total size) is transferred between the pipe region and the corresponding endpoint. As the data unit, a data unit of which transfer is requested by an I/O request packet (IRP), or a data unit obtained by dividing the above data unit into an appropriate size may be used. The data transfer (series of transactions) to the endpoint in the above data unit may be called the "pipe" in this embodiment, and a region which stores the data (transmission data or reception data) of the "pipe" is the pipe region.

When the transfer in a given data unit using the pipe region is completed, the pipe region is released. The released pipe region is then assigned to an arbitrary endpoint. In this embodiment, the correspondence between the pipe region and the endpoint can be dynamically changed in this manner.

In this embodiment, the endpoint regions EP 0 to EP e are allocated in the packet buffer 100 during the peripheral operation, as shown in FIG. 12B. Data is transferred between each endpoint region and the host.

As described above, in this embodiment, the buffer region of the packet buffer 100 is assigned to the pipe region during the host operation and is assigned to the endpoint region during the peripheral operation. This enables the resources of the packet buffer 100 to be used in common during the host operation and the peripheral operation, whereby the use storage capacity of the packet buffer 100 can be saved. The number of pipe regions and the number of endpoint regions are not limited, and may be arbitrary.

3.1.3 Operation Flow

A retransmission transaction corresponding to a NAK response may be issued by a transfer including the handshake phase, specifically, by a control transfer, a bulk transfer, and an interrupt transfer. However, since an interrupt transfer performs data transfer at a predetermined transfer interval in frame units, it is necessary to issue a retransmission transaction in a frame at the transfer interval from the current frame even if a NAK response is returned. Therefore, in this embodiment, the above-described NAK skip operation is performed when performing a control transfer and a bulk transfer.

Figure 13:
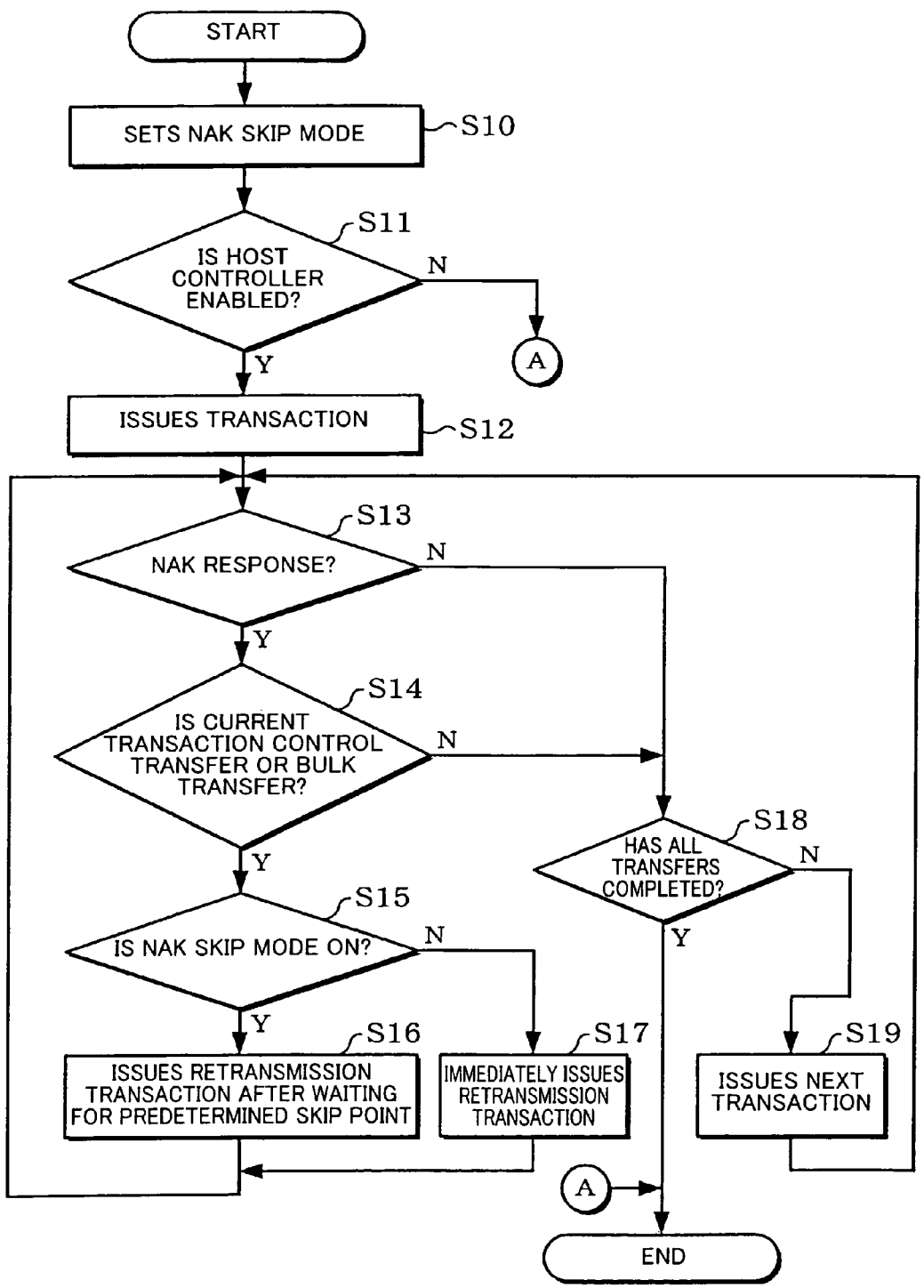
FIG. 13 shows an example of an operation flow of a NAK skip of a data transfer control device in an embodiment of the present invention.

FIG. 13 shows an example of an operation flow of the NAK skip of the data transfer control device in this embodiment. In this example, the NAK skip mode can be enabled or disabled for each endpoint.

The firmware sets whether or not to enable the NAK skip mode in the NAK skip mode setting register section 74 (step S10). The firmware enables or disables the NAK skip mode for each endpoint.

In the data transfer control device in which the NAK skip mode is enabled or disabled, when the host controller 50 is enabled (step S11: Y), the host controller 50 issues a transaction of a pipe for which transfer is requested (step S12). When the host controller 50 is disabled (step S11: N), a series of operations is finished (END).

After the transaction has been issued in the step S12, the host controller 50 detects the presence or absence of a NAK response from the peripheral (step S13). When a NAK response has been returned from the peripheral (step S13: Y), the host controller 50 determines whether or not the current transaction issued in the step S12 is a transaction of a control transfer or a bulk transfer (step S14).

When the host controller 50 determines that the current transaction is a transaction of a control transfer or a bulk transfer in the step S14 (step S14: Y), the host controller 50 determines whether or not the NAK skip mode of the pipe for which the current transaction is issued is enabled (ON) (step S15).

When the host controller 50 determines that the NAK skip mode is enabled (step S15: Y), the host controller 50 allows issuance of a transaction the same as the transaction issued in the step S12 as a retransmission transaction after waiting for a predetermined skip point, issues the retransmission transaction at the predetermined skip point if another transfer request does not exist (step S16), and returns to the step S13.

When the host controller 50 determines that the NAK skip mode is disabled (OFF) in the step S15 (step S15: N), the host controller 50 immediately issues a transaction the same as the transaction issued in the step S12 as a retransmission transaction (step S17), and returns to the step S13.

When the host controller 50 determines that a NAK response has not been returned in the step S13 (step S13: N), or when the host controller 50 determines that the current transaction is not a transaction of a control transfer or a bulk transfer in the step S14 (step S14: N), or when all the transfers have been completed (step S18: Y), a series of operations is finished (END). When all the transfers have not been completed in the step S18 (step S18: N), the host controller 50 issues the next transaction according to the schedule (step S19), and returns to the step S13.

3.2 Configuration Example of Each Block

A major configuration of each block of the data transfer control device which realizes the above-described NAK skip operation is described below.

3.2.1 Register Section

Figure 14:
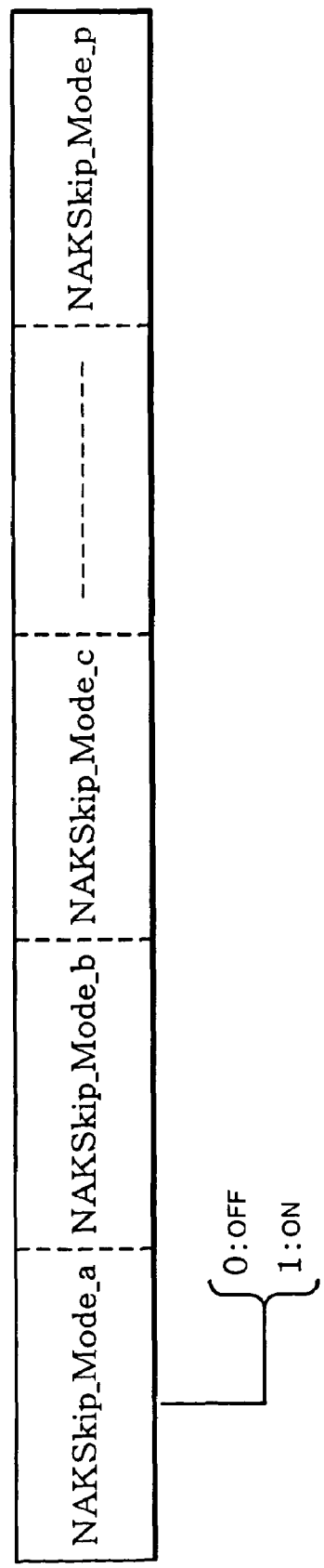
FIG. 14 shows a configuration example of a NAK skip mode setting register section.

FIG. 14 shows a configuration example of the NAK skip mode setting register section 74. In the NAK skip mode setting register section 74, "1" which designates "ON" of the NAK skip mode or "0" which designates "OFF" of the NAK skip mode is set in a field NAK_Skip_Mode_x (x is one of a to p) corresponding to the pipe (or endpoint of the peripheral).

Figure 15:
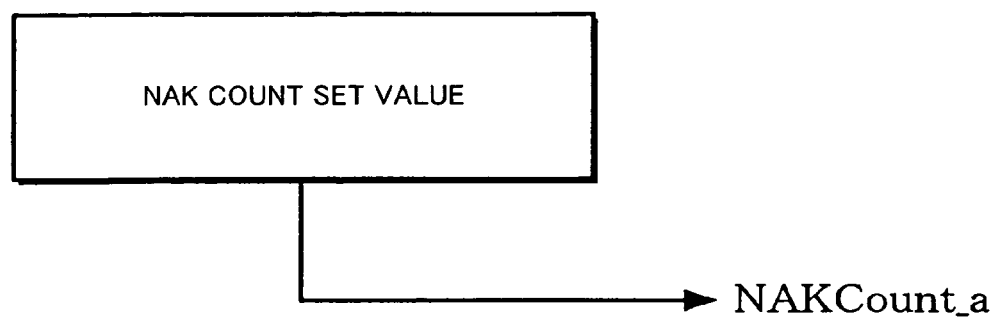
FIG. 15 shows a configuration example of a NAK count setting register section.

FIG. 15 shows a configuration example of the NAK count setting register section 76. The NAK count setting register section 76 includes a NAK count setting register for each pipe (or each endpoint of the peripheral). FIG. 15 shows a configuration example of the NAK count setting register of the pipe a. However, the NAK count setting registers of other pipes have the same configuration as the NAK count setting register of the pipe a. The NAK count set value set in the NAK count setting register of the pipe a is output as a signal NAKCount_a. Therefore, the NAK count setting register section 76 outputs signals NAKCount_a to NAKCount_p.

Figure 16:
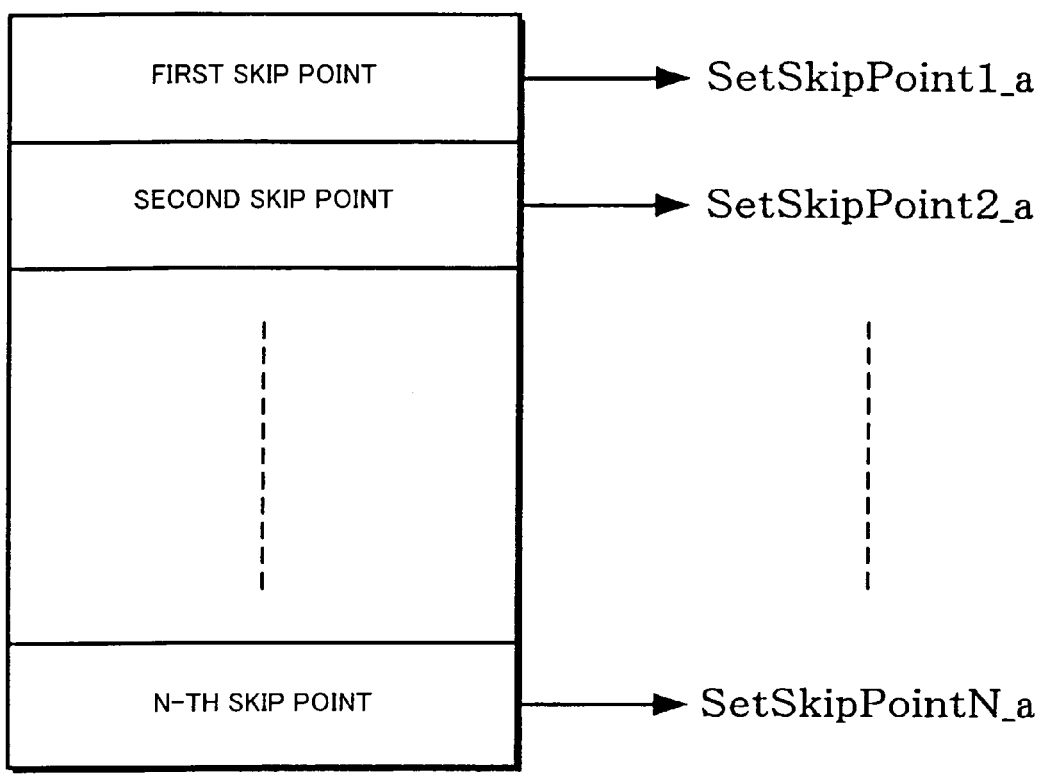
FIG. 16 shows a configuration example of a skip point setting register section.

FIG. 16 shows a configuration example of the skip point setting register section 78. The skip point setting register section 78 includes a skip point setting register for each pipe (or each endpoint). FIG. 16 shows the configuration example of the skip point setting register of the pipe a. However, the skip point setting registers of other pipes have the same configuration as the skip point setting register of the pipe a. The first to N-th skip points set in the skip point setting register of the pipe a are output as signals SetSkipPoint1_a to SetSkipPointN_a. Therefore, the skip point setting register section 78 outputs signals SetSkipPoint1_a to SetSkipPointN_a, SetSkipPoint1_b to SetSkipPointN_b, . . . , and SetSkipPoint1_p to SetSkipPointN_p.

3.2.2 Transfer Controller

Figure 17:
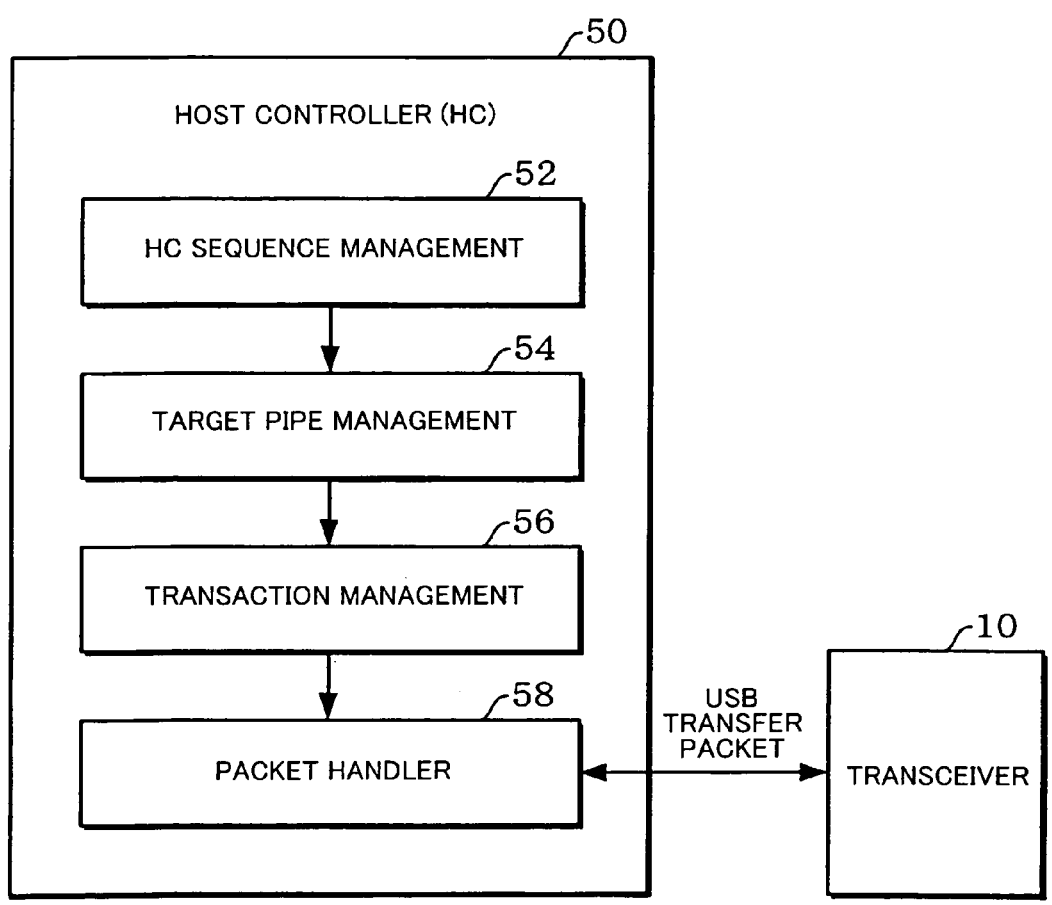
FIG. 17 is a block diagram of a configuration example of a host controller.

FIG. 17 shows a block diagram of a configuration example of the host controller 50.

The host controller 50 includes an HC sequence management section 52. The HC sequence management section 52 performs arbitration between pipe transfers (data transfers using the pipe regions), time management, scheduling of pipe transfers, retransmission management, and the like.

In more detail, the HC sequence management section 52 counts the frame number and directs transmission of an start-of-frame (SOF) packet. The HC sequence management section 52 performs processing of preferentially executing an isochronous transfer at the head of each frame, and processing of preferentially handling an interrupt transfer following an isochronous transfer. The HC sequence management section 52 performs processing of directing each pipe transfer according to the order of pipe transfers. The HC sequence management section 52 manages the number of continuous issuances of transactions and confirms the remaining frame time. The HC sequence management section 52 performs processing of a handshake packet (ACK or NAK) returned from the peripheral. The HC sequence management section 52 performs error processing when issuing a transaction.

The host controller 50 includes a target pipe management section 54. The target pipe management section 54 performs handing processing of the transfer condition information set in the transfer condition register section 72 and the like. The target pipe management section 54 directs transfer to a transaction management section 56.

The host controller 50 includes the transaction management section 56. The transaction management section 56 manages the types and transfer order of transfer packets (transaction sequence management). The transaction management section 56 performs timeout monitor processing. The transaction management section 56 performs notification processing of completion of transactions.

The host controller 50 includes a packet handler section 58. The packet handler section 58 performs assembly/disassembly processing of packets. The packet handler section 58 checks the packet ID (PID) and decodes/encodes CRC. The packet handler section 58 performs read/write processing of the payload of a packet in the buffer region and transmission processing of an SOF packet. The packet handler section 58 performs count processing of transmission/reception data.

Each section of the host controller 50 may be realized by a hardware circuit, or may be realized by firmware and a hardware circuit.

Figure 18:
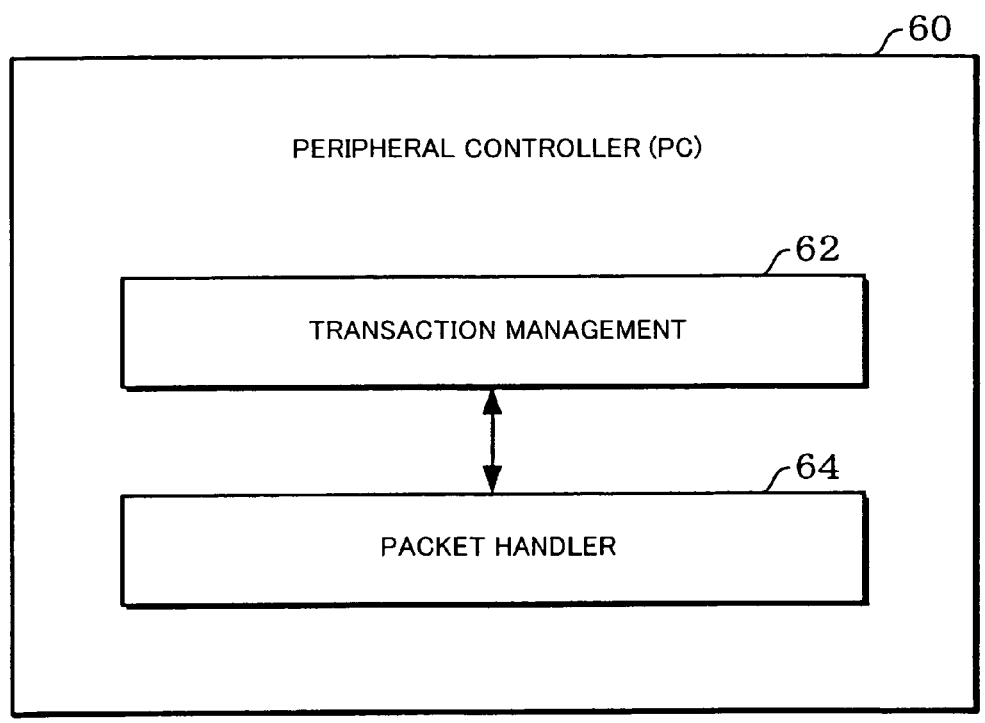
FIG. 18 is a block diagram of a configuration example of a peripheral controller.

FIG. 18 shows a block diagram of a configuration example of the peripheral controller 60.

The peripheral controller 60 includes a transaction management section 62 and a packet handler section 64. The transaction management section 62 performs processing almost the same as the processing of the transaction management section 56 of the host controller 50. The packet handler section 64 performs processing almost the same as the processing of the packet handler section 58 of the host controller 50.

Each section of the peripheral controller 60 may be realized by a hardware circuit, or may be realized by firmware and a hardware circuit.

In this embodiment, the transfer controller 40 realizes the above-described NAK skip operation. In more detail, the host controller 50 realizes the NAK skip operation. The host controller 50 schedules a transfer initiation request for each pipe from the firmware, and issues a transaction. The host controller 50 realizes the NAK skip by masking the transfer initiation request. A detailed configuration example of the host controller 50 is described below.

3.2.2.1 Detailed Configuration Example of Host Controller

Figure 19:
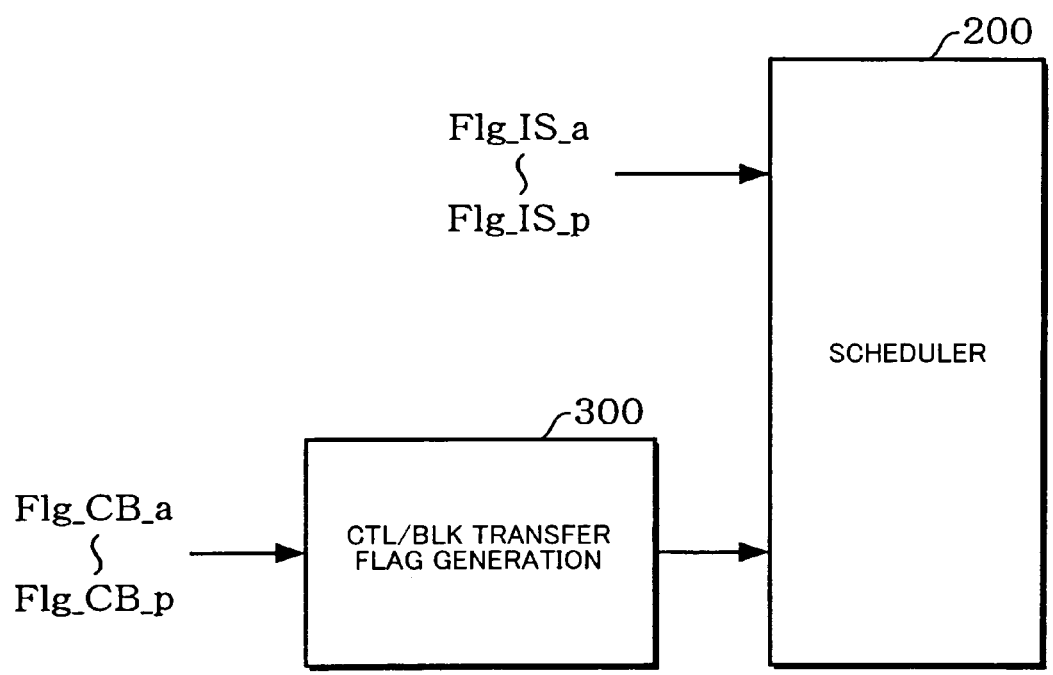
FIG. 19 is a block diagram of a configuration example of an HC sequence management section.

FIG. 19 shows a block diagram of a configuration example of the HC sequence management section 52. The HC sequence management section 52 includes a scheduler 200. The scheduler 200 selects a target pipe by referring to a transfer initiation request flag of an interrupt transfer, a transfer initiation request flag of an isochronous transfer, a transfer initiation request flag of a control transfer, or a transfer initiation request flag of a bulk transfer for each pipe. A transaction for performing transfer of the pipe selected by the scheduler is issued by the host controller 50.

The firmware supplies the transfer initiation request flag (Flg_IS_a to Flg_IS_p) of an interrupt transfer or an isochronous transfer of each pipe to the scheduler 200. The firmware supplies the transfer initiation request flag (Flg_CB_a to Flg_CB_p) of a control transfer or a bulk transfer of each pipe to a CTL/BLK transfer flag generation section 300.

The HC sequence management section 52 includes the CTL/BLK transfer flag generation section 300. The CTL/BLK transfer flag generation section 300 realizes the NAK skip operation by masking the transfer initiation request flag (Flg_CB_a to Flg_CB_p) of a control transfer or a bulk transfer of each pipe and informing the scheduler 200 of the transfer initiation request flag of each pipe during the NAK skip operation.

Figure 20:
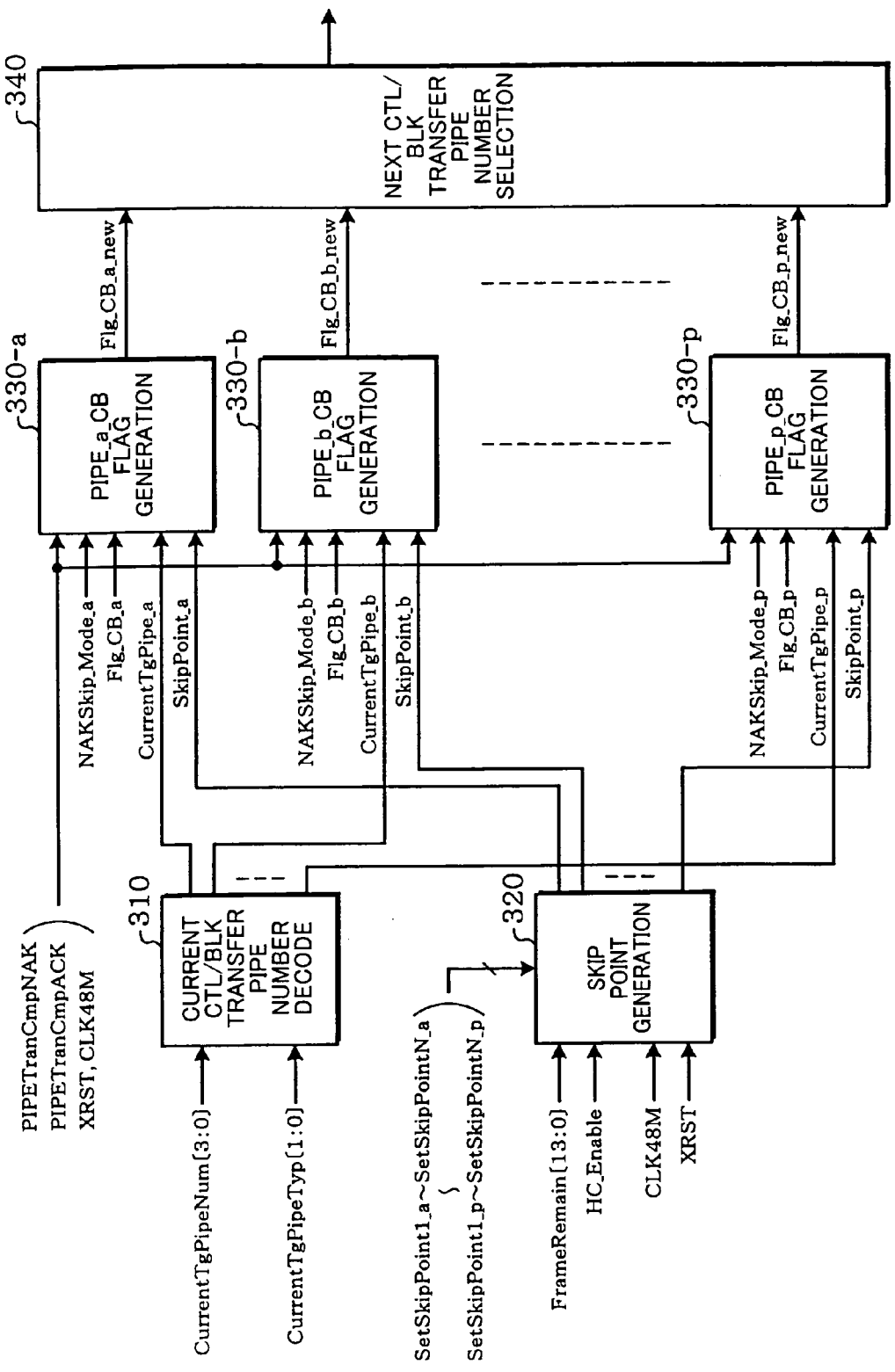
FIG. 20 is a block diagram of a configuration example of a CTL/BLK transfer flag generation section.

FIG. 20 shows a block diagram of a configuration example of the CTL/BLK transfer flag generation section 300.

The CTL/BLK transfer flag generation section 300 includes a current CTL/BLK transfer pipe number decode section 310. The current CTL/BLK transfer pipe number decode section 310 decodes and outputs the pipe number currently under control transfer or bulk transfer.

FIG. 21 shows a truth table of an operation example of the current CTL/BLK transfer pipe number decode section 310. A signal CurrentTgPipeNum[3:0], which indicates the pipe number currently under transfer, and a signal CurrentTgPipeTyp[1:0], which indicates the transfer type of the pipe currently under transfer, are input to the current CTL/BLK transfer pipe number decode section 310. The signal CurrentTgPipeNum[3:0] is a signal in which the pipe number which indicates one of the pipe a to pipe p is coded. The signal CurrentTgPipeTyp[1:0] is a signal in which one of control transfer (00), isochronous transfer (01), bulk transfer (10), and interrupt transfer (11) is coded. The current CTL/BLK transfer pipe number decode section 310 asserts (1) one of the signals CurrentTgPipe_a to CurrentTgPipe_p corresponding to the pipe number currently under control transfer or bulk transfer. For example, when the transfer type of the pipe a currently under transfer is a control transfer or a bulk transfer, only the signal CurrentTgPipe_a is set at "1", and the signals CurrentTgPipe_b to CurrentTgPipe_p are set at "0".

In FIG. 20, the CTL/BLK transfer flag generation section 300 includes a skip point generation section 320. The skip point generation section 320 generates signals SkipPoint_a to SkipPoint_p which designate skip points based on the value set in the skip point setting register section 78.

Figure 22:
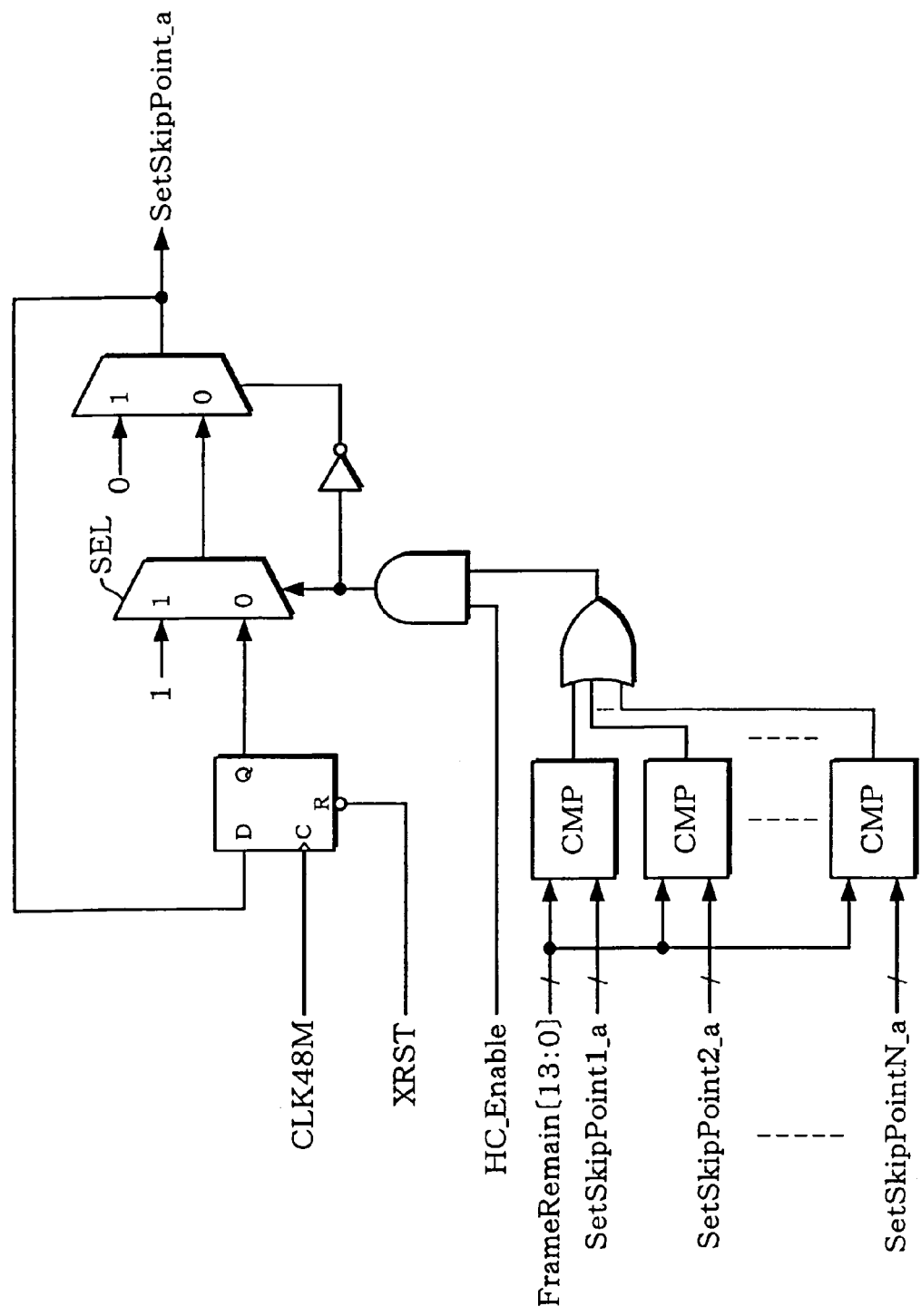
FIG. 22 is a block diagram of a configuration example of a skip point generation section.

FIG. 22 shows a block diagram of a configuration example of the skip point generation section 320. FIG. 22 shows a configuration example for setting up the skip point in the FS mode. However, the skip point may be set up in the LS mode or the HS mode in the same manner as in the FS mode. FIG. 22 shows only a configuration for generating the skip point of the pipe a. However, the configurations for generating the skip points of the pipe b to pipe p are the same as the configuration shown in FIG. 22.

In FIG. 22, the output from an AND circuit to which the HC enable signal HC_Enable is input selectively controls a selector SEL. The selector SEL selectively outputs "1" when the output from the AND circuit is set at "1", and selectively outputs a signal from a data output terminal Q of a D flip-flop when the output from the AND circuit is set at "0". The operation of the selector SEL is the same as described above in the following description.

A signal FrameRemain[13:0] which indicates a count value corresponding to the remaining time of a frame, the HC enable signal HC_Enable, a 48-MHz system clock signal CLK48M, and a system reset signal XRST are input to the skip point generation section 320. In the LS mode, the signal FrameRemain[13:0] is decremented from 11999 to 0.

Figure 23:
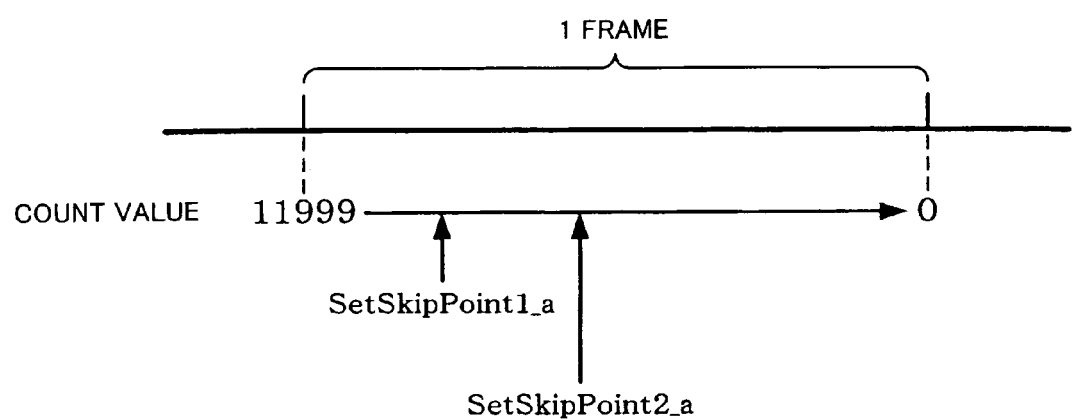
FIG. 23 is illustrative of a setting example of a skip point.

FIG. 23 shows an explanatory diagram of a setting example of the skip point. When the first to N-th skip points are set in the skip point setting register section 78, the count value of the signal FrameRemain[13:0] decremented in a frame is used. For example, count values 9000 and 6000 of the signal FrameRemain[13:0] may be used as the first and second skip points.

Therefore, as shown in FIG. 22, the skip point generation section 320 includes comparators which compare the signal FrameRemain[13:0] with each of the signals SetSkipPoint1_a to SetSkipPointN_a. The coincidence between the signal FrameRemain[13:0] and one of the signals SetSkipPoint1_a to SetSkipPointN_a can be detected by the comparators. When the signal FrameRemain[13:0] coincides with one of the signals SetSkipPoint1_a to SetSkipPointN_a in a state in which the signal HC_Enable is asserted, the signal SetSkipPoint_a is asserted to "1" by the selector SEL. The skip point generation section 320 outputs a pulse asserted to "1" in synchronization with the system clock signal CLK48M. The skip point generation section 320 may output pulses of the signals SetSkipPoint_b to SetSkipPoint_p asserted to "1".

In FIG. 20, the CTL/BLK transfer flag generation section 300 includes a PIPE_a_CB flag generation section 330-a to a PIPE_p_CB flag generation section 330-p. Each of the PIPE_a_CB flag generation section 330-a to the PIPE_p_CB flag generation section 330-p has the same configuration.

The signals CurrentTgPipe_a and SkipPoint_a are input to the PIPE_a_CB flag generation section 330-a. The PIPE_a_CB flag generation section 330-a outputs a signal Flg_CB_a_new generated by masking the transfer initiation request flag Flg_CB_a of a control transfer or a bulk transfer of the pipe a from the firmware based on the signal SkipPoint_a. The signals CurrentTgPipe_b and SkipPoint_b are input to the PIPE_b_CB flag generation section 330-b. The PIPE_b_CB flag generation section 330-b outputs a signal Flg_CB_b_new generated by masking the transfer initiation request flag Flg_CB_b of a control transfer or a bulk transfer of the pipe b from the firmware based on the signal SkipPoint_a. The signals CurrentTgPipe_p and SkipPoint_p are input to the PIPE_p_CB flag generation section 330-p. The PIPE_p_CB flag generation section 330-p outputs a signal Flg_CB_p_new generated by masking the transfer initiation request flag Flg_CB_p of a control transfer or a bulk transfer of the pipe p from the firmware.

Figure 24:
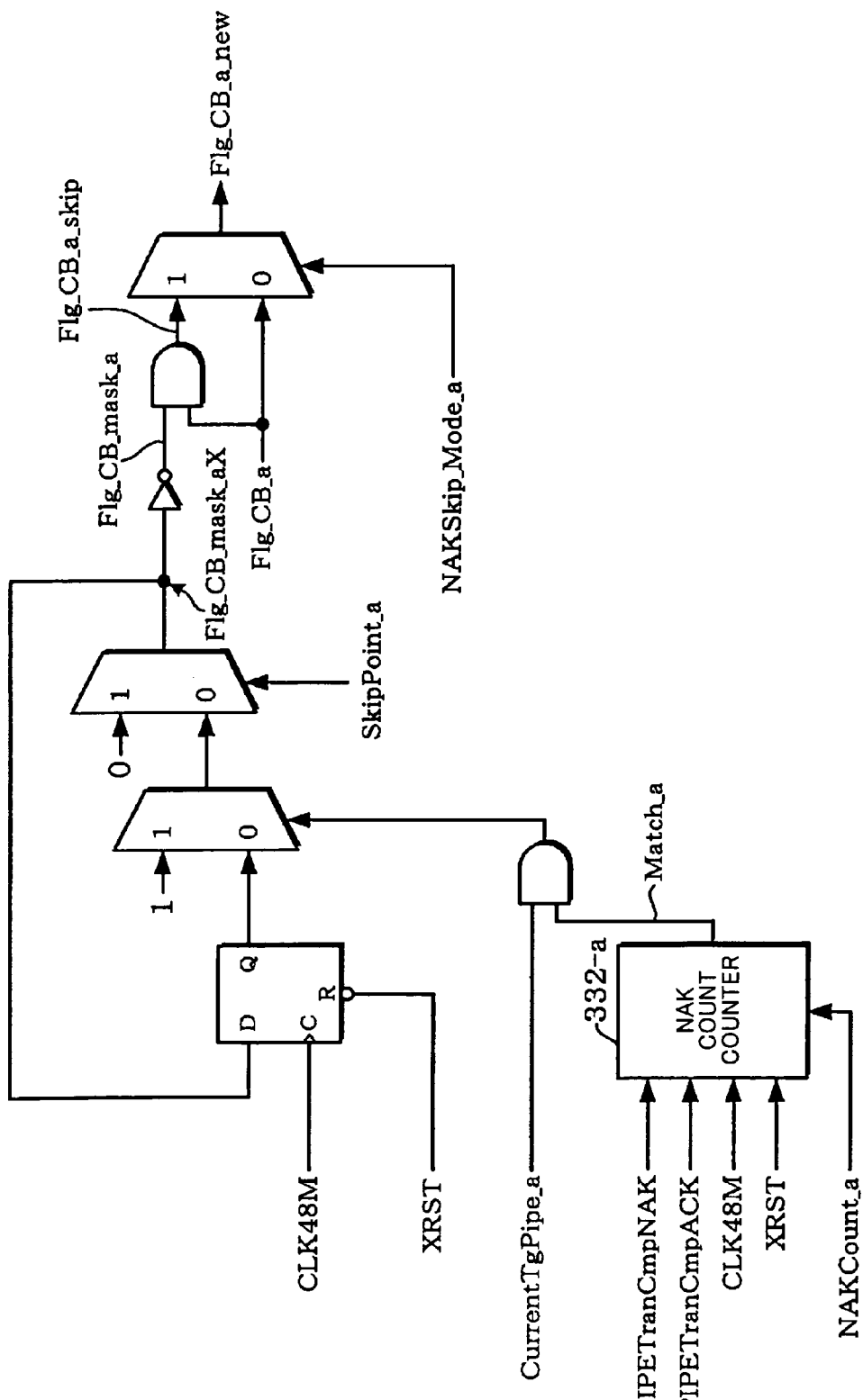
FIG. 24 is a block diagram of a configuration example of a PIPE_a_CB flag generation section.

FIG. 24 is a block diagram showing a configuration example of the PIPE_a_CB flag generation section 330-a. The configuration example of the PIPE_a_CB flag generation section 330-a is described below. However, the same description applies to the PIPE_b_CB flag generation section 330-b to the PIPE_p_CB flag generation section 330-p.

The PIPE_a_CB flag generation section 330-a generates a signal Flg_CB_mask_a which is a mask signal for masking the transfer initiation request flag Flg_CB_a from the firmware. Therefore, the PIPE_a_CB flag generation section 330-a includes a NAK count counter 332-a. The NAK count counter 332-a counts the number of NAK responses to a transaction of the pipe a. The NAK count counter 332-a is initialized when an ACK response is returned for a transaction of the pipe a.

Figure 25:
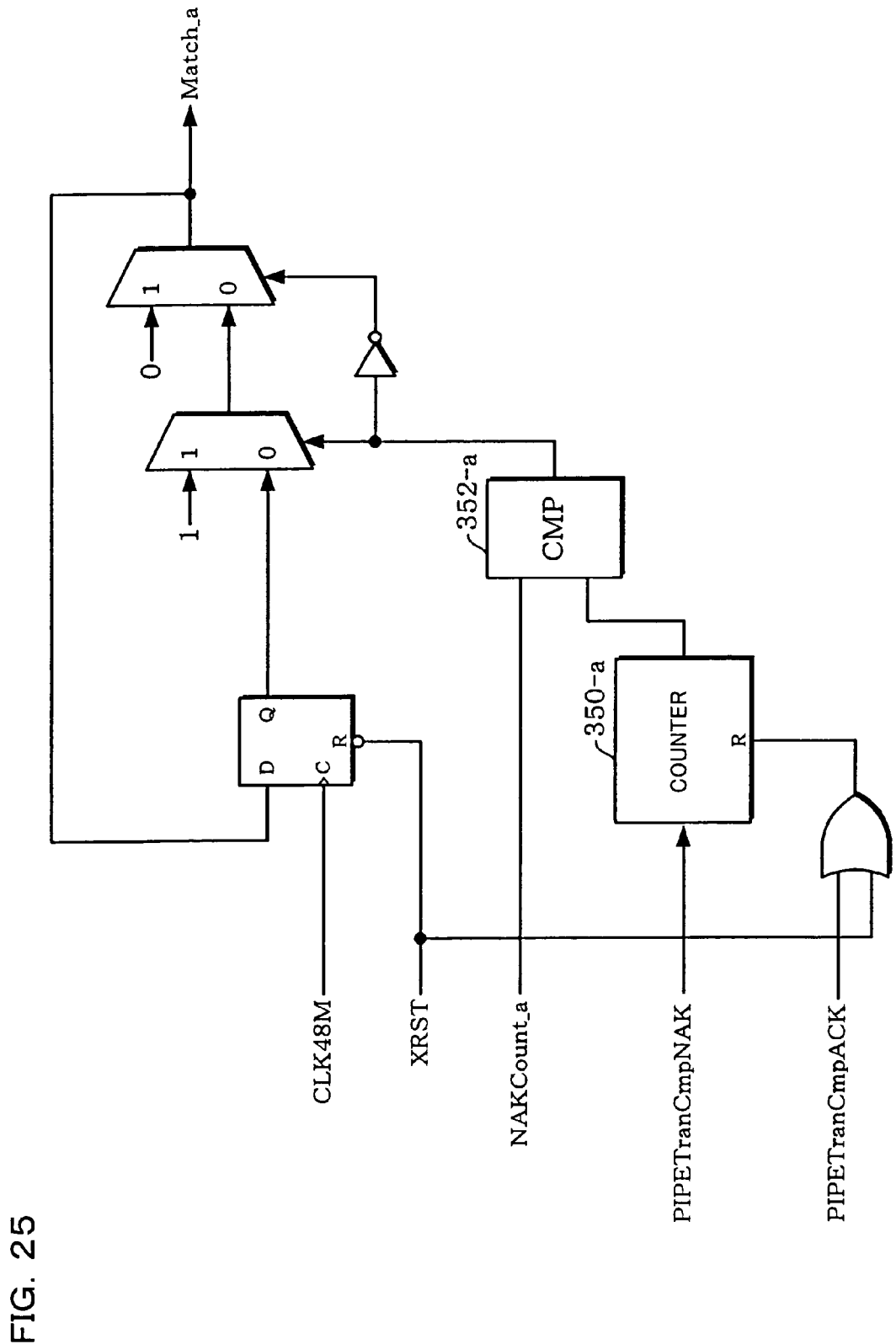
FIG. 25 is a block diagram of a configuration example of a NAK count counter.

FIG. 25 is a block diagram showing a configuration example of the NAK count counter 332-a.

The NAK count counter 332-a includes a counter 350-a and a comparator 352-a. The counter 350-a counts the NAK responses based on a signal PIPETranCmpNAK which indicates that a transaction has been completed by a NAK response. The signal PIPETranCmpNAK is generated by firmware or a hardware circuit which detects a NAK response to the issued transaction. The counter 350-a is initialized by a signal PIPETranCmpACK which indicates that a transaction has been completed by an ACK response or the system reset signal XRST. The signal PIPETranCmpACK is generated by firmware or a hardware circuit which detects an ACK response to the issued transaction.

The comparator 352-a compares a NAK count value NAKCount_a with the counter value of the counter 350-a, and outputs a pulse asserted to "1" when these values coincide. The NAK count value NAKCount_a is supplied from the NAK count setting register section 76 shown in FIG. 15.

The NAK count counter 332-a outputs a pulse asserted to "1" when the counter value of the counter 350-a coincides with the NAK count value NAKCount_a as a coincidence detection signal Match_a in synchronization with the system clock signal CLK48M by using the configuration shown in FIG. 25.

Issuance of a retransmission transaction for the last NAK response returned when the number of NAK responses has reached a predetermined number can be allowed after waiting for a predetermined skip point by using the NAK count counter 332-a.

In FIG. 24, a signal Flg_CB_mask_aX is set at "0" (L level) (negated) by the system reset signal XRST. After a transaction of a control transfer or a bulk transfer of the pipe a has been issued, when the signal CurrentTgPipe_a is asserted and the coincidence detection signal Match_a is asserted, the signal Flg_CB_mask_aX is asserted (state in which the signal SkipPoint_a is negated). When the signal SkipPoint_a is then asserted, the signal Flg_CB_mask_aX is negated. An inversion output of the signal Flg_CB_mask_aX becomes the signal Flg_CB_mask_a.

When the signal NAKSkip_Mode_a is negated (when the NAK skip mode is disabled (OFF)), the signal Flg_CB_a_new is the signal Flg_CB_a supplied from the firmware. When the signal NAKSkip_Mode_a is asserted (when the NAK skip mode is enabled (ON)), the signal Flg_CB_a_new is the AND operation result of the signal Flg_CB_a and the signal Flg_CB_a. Issuance of a retransmission transaction is allowed after waiting for a predetermined skip timing by masking the transfer initiation request flag until the predetermined skip point is passed.

The PIPE_a_CB flag generation section 330-b to the PIPE_p_CB flag generation section 330-p respectively output signals Flg_CB_b_new to Flg_CB_p_new generated by masking signals Flg_CB_b to Flg_CB_p from the firmware.

In FIG. 24, the NAK count counter 332-a is provided. However, the present invention is not limited thereto. In the case of performing the NAK skip when receiving a NAK response once, the AND operation result of the signal PIPETranCmpNAK and the signal CurrentTgPipe_a may be directly input to the selector in the subsequent stage of the D flip-flop.

In FIG. 20, the CTL/BLK transfer flag generation section 300 includes a next CTL/BLK transfer pipe number selection section 340. The next CTL/BLK transfer pipe number selection section 340 selects the pipe number for which a transaction of a control transfer or a bulk transfer to be issued subsequent to the current transaction. The signals Flg_CB_a_new to Flg_CB_p_new are input to the next CTL/BLK transfer pipe number selection section 340. The next CTL/BLK transfer pipe number selection section 340 determines the next transfer target pipe from the pipes for which the signals Flg_CB_a_new to Flg_CB_p_new are asserted, and outputs the pipe number.

The pipe number is supplied to the scheduler 200 as shown in FIG. 19. The scheduler 200 determines the next transfer target pipe from the pipes for which the transfer initiation request flag of a control transfer or a bulk transfer which is masked at least until the next skip point is passed and the transfer initiation request flag of an interrupt transfer or an isochronous transfer from the firmware are asserted.

Figure 26:
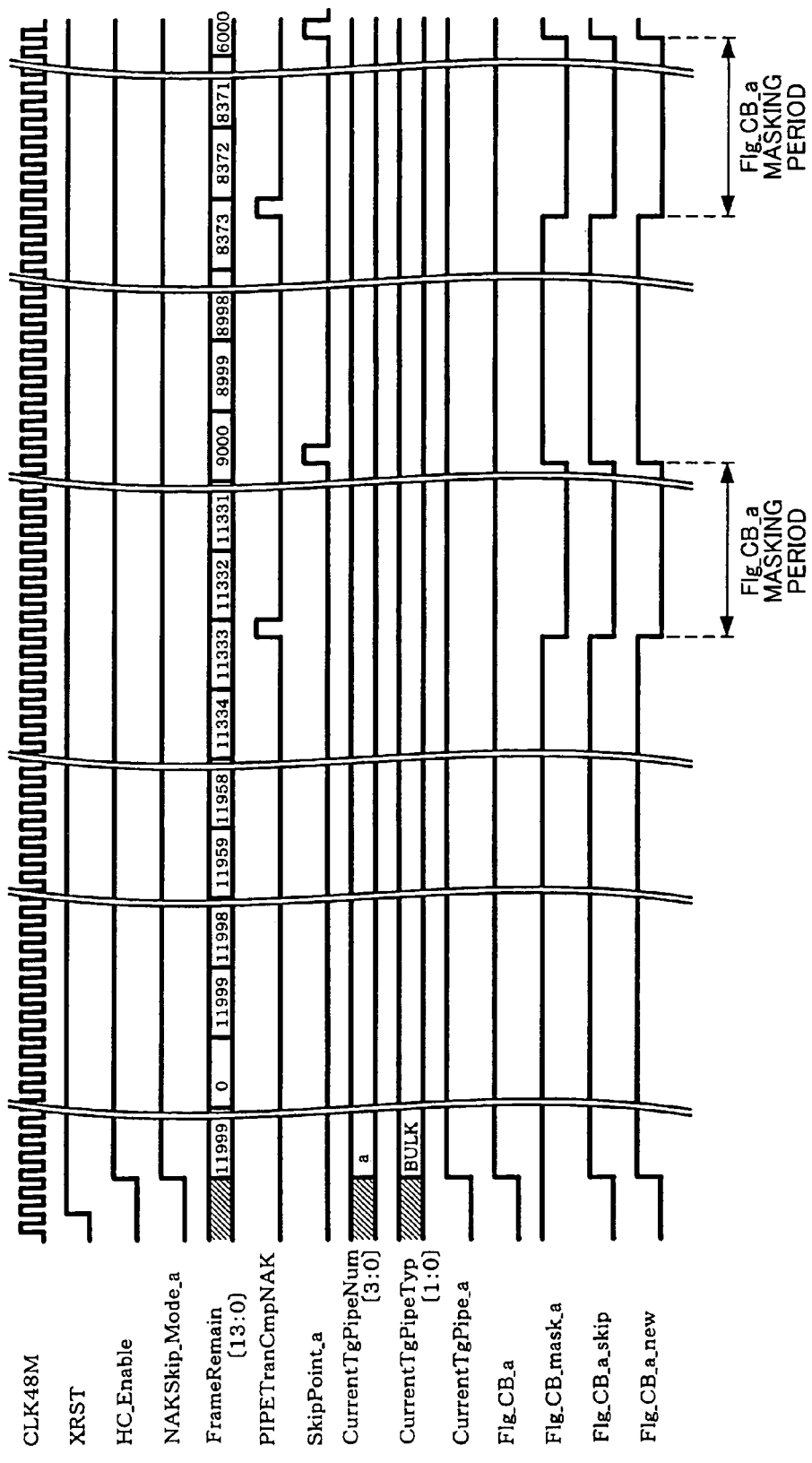
FIG. 26 is a timing diagram of an operation example of a PIPE_a_CB flag generation section.

FIG. 26 shows a timing diagram of an operation example of the PIPE_a_CB flag generation section 330-*a*. In this example, a bulk transfer of the pipe a is performed in the FS mode. The skip points are set when the count value of the signal FrameRemain[13:0] is 9000 and 6000. The signal FrameRemain[13:0] is decremented from 11999 to 0 in one frame.

A bulk transfer is started when the HC enable signal HC_Enable is asserted and the signal Flg_CB_a from the firmware is asserted in a state in which the NAK skip mode of the pipe a is enabled. The count value of the signal FrameRemain[13:0] freely runs in the first frame, and is decremented from 11999 to 0 when the next frame is started. A transaction of a bulk transfer is started in this frame. A NAK response to the transaction is returned from the peripheral, and the signal PIPETranCmpNAK is asserted when the count value of the signal FrameRemain[13:0] is 11333, for example.

The signal SkipPoint_a is asserted when the count value of the signal FrameRemain[13:0] is 9000 or 6000. Therefore, the signal Flg_CB_a_new generated by masking the signal Flg_CB_a is output until the signal SkipPoint_a is asserted when the count value of the signal FrameRemain [13:0] becomes 9000 after the signal PIPETranCmpNAK has been asserted.

Therefore, when the count value of the signal FrameRemain[13:0] becomes 9000 or less, issuance of the retransmission transaction of the transaction of a bulk transfer of the pipe a is allowed. When the count value of the signal FrameRemain[13:0] becomes 9000 and another transfer request does not exist, the retransmission transaction is issued.

A NAK response to the retransmission transaction is returned from the peripheral. When the signal PIPETranCmpNAK is asserted when the count value of the signal FrameRemain[13:0] is 8373, the signal Flg_CB_a_new generated by masking the signal Flg_CB_a is output until the signal SkipPoint_a is asserted when the count value of the signal FrameRemain[13:0] becomes 6000. Therefore, when the count value of the signal FrameRemain[13:0] becomes 6000 or less, issuance of the retransmission transaction of the transaction of a bulk transfer of the pipe a is allowed.

Figure 27:
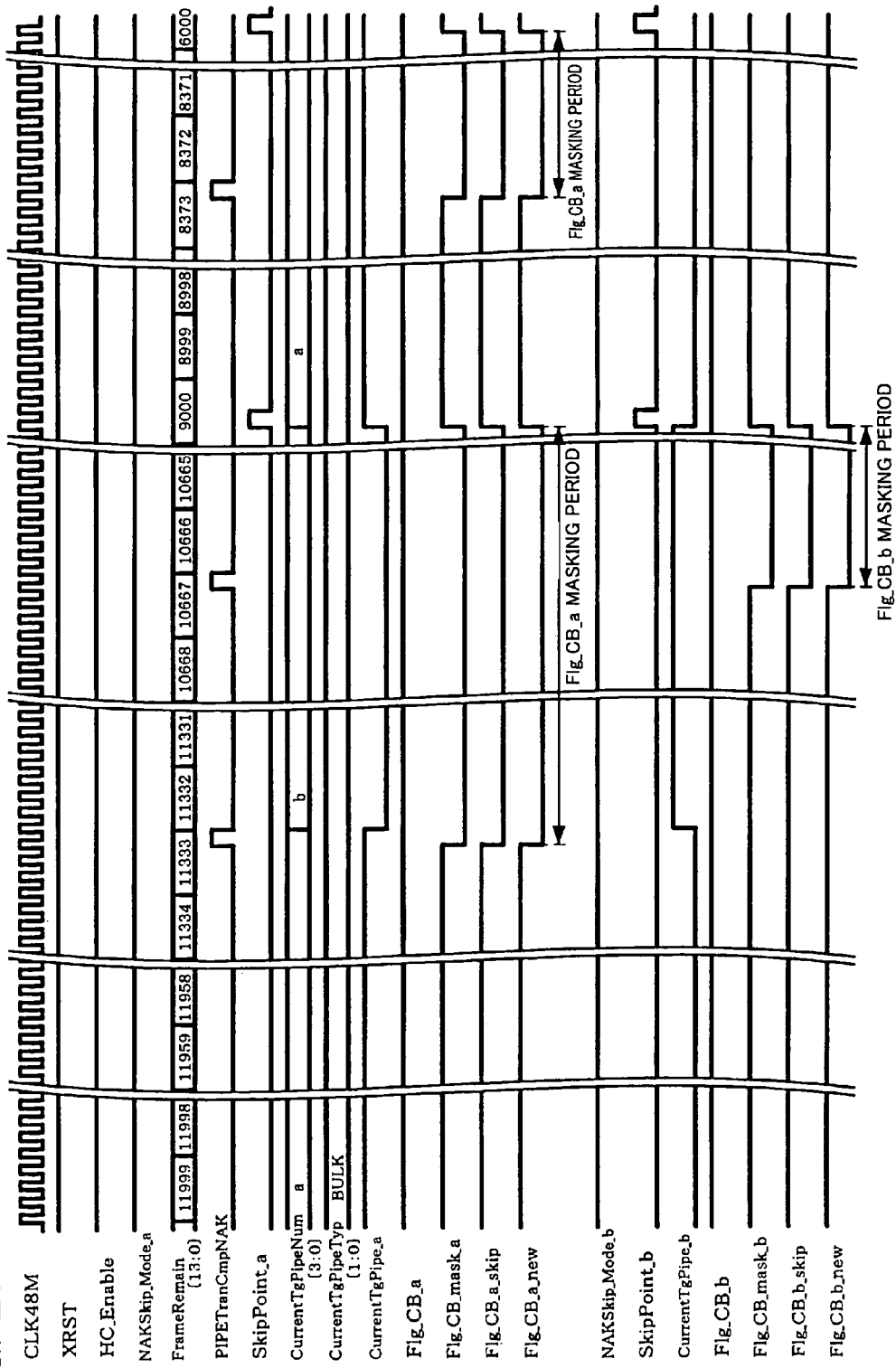
FIG. 27 is a timing diagram of an operation example of a PIPE_a_CB flag generation section and a PIPE_b_CB flag generation section.

FIG. 27 shows a timing diagram of an operation example of the PIPE_a_CB flag generation section 330-*a* and the PIPE_b_CB flag generation section 330-*b*. In this example, bulk transfers of the pipes a and b are performed in the FS mode. The skip points for the pipes a and b are set when the count value of the signal FrameRemain[13:0] is 9000 and 6000.

A bulk transfer of the pipe a is started when the HC enable signal HC_Enable is asserted and the signals Flg_CB_a and Flg_CB_b from the firmware are asserted in a state in which the NAK skip mode of the pipes a and b is enabled.

A NAK response to the transaction of the pipe a is returned from the peripheral, and the signal PIPETranCmpNAK is asserted when the count value of the signal FrameRemain[13:0] is 11333, for example. Therefore, the signal Flg_CB_a_new generated by masking the signal Flg_CB_a is output until the signal SkipPoint_a is asserted when the count value of the signal FrameRemain[13:0] becomes 9000 after the signal PIPETranCmpNAK has been asserted. Therefore, when the count value of the signal FrameRemain [13:0] becomes 9000 or less, issuance of the retransmission transaction of the transaction of a bulk transfer of the pipe a is allowed.

A transaction of the pipe b is issued by the signal PIPETranCmpNAK when the count value of the signal FrameRemain[13:0] is 11333. A NAK response to this transaction is returned from the peripheral, and the signal PIPETranCmpNAK is asserted when the count value of the signal FrameRemain[13:0] is 10667, for example. Therefore, the signal Flg_CB_b_new generated by masking the signal Flg_CB_b is output until the signal SkipPoint_a is asserted when the count value of the signal FrameRemain [13:0] becomes 9000 after the signal PIPETranCmpNAK has been asserted. Therefore, when the count value of the signal FrameRemain[13:0] becomes 9000 or less, issuance of the retransmission transaction of the transaction of bulk transfer of the pipe b is allowed.

Since the priority of transfer of the pipe a is higher than transfer of the pipe b, the retransmission transaction of the pipe a is issued after the count value of the signal FrameRemain[13:0] has become less than the skip point at 9000. A NAK response to the retransmission transaction is returned from the peripheral. When the signal PIPETranCmpNAK is asserted when the count value of the signal FrameRemain [13:0] is 8373, the signal Flg_CB_a_new generated by masking the signal Flg_CB_a is output until the signal SkipPoint_a is asserted when the count value of the signal FrameRemain[13:0] becomes 6000. Therefore, when the count value of the signal FrameRemain[13:0] becomes 6000 or less, issuance of the retransmission transaction of the transaction of a bulk transfer of the pipe a is allowed.

As described above, the host controller 50 masks the transfer initiation requests from the firmware, and schedules the masked transfer initiation requests between the pipes to realize the NAK skip.

Other blocks of the data transfer control device are described below.

3.2.3 OTG Controller

Figure 28:
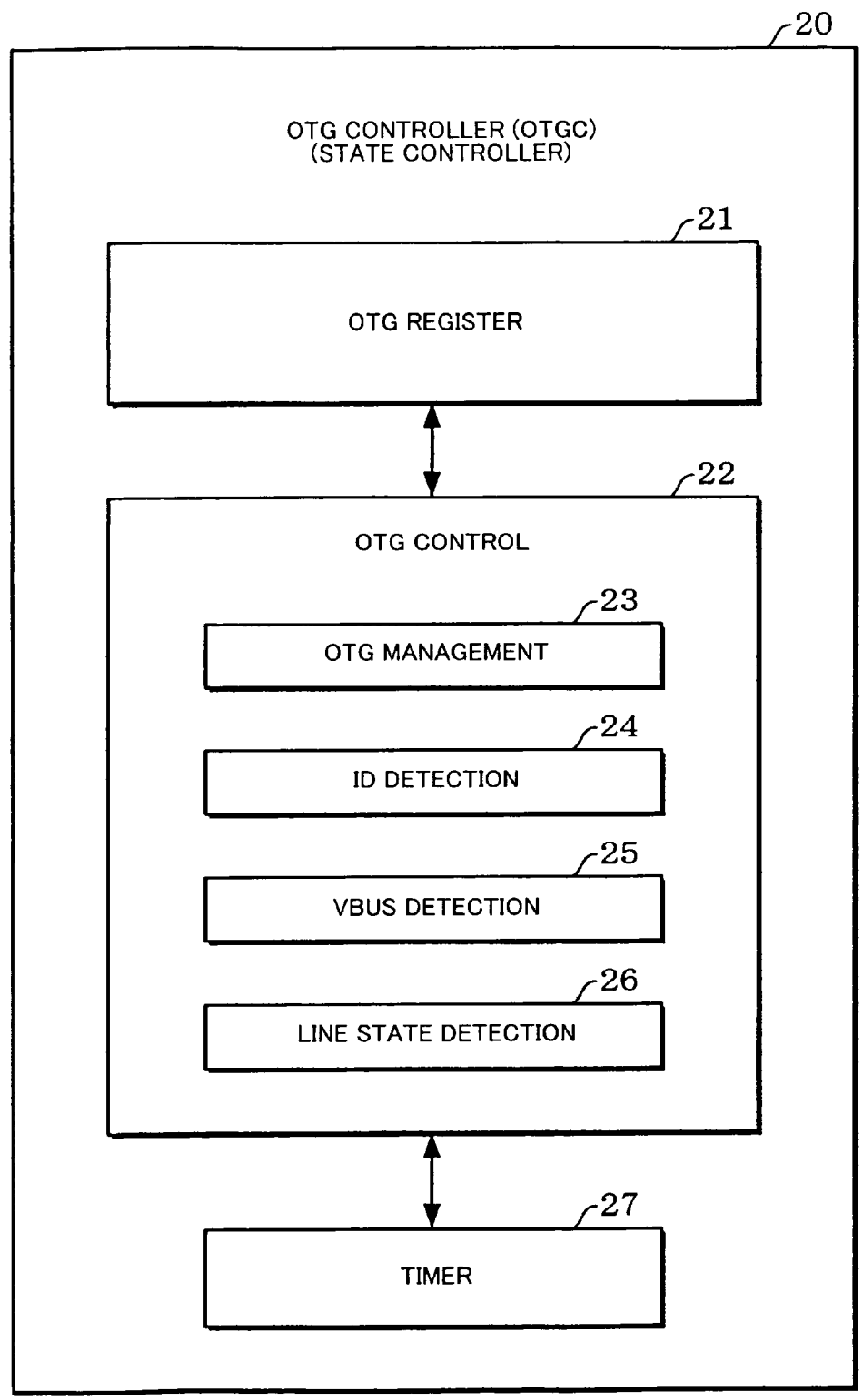
FIG. 28 is a block diagram of a configuration example of an OTG controller.

FIG. 28 shows a block diagram of a configuration example of the OTG controller 20.

The OTG controller 20 includes an OTG register section 21. The OTG register section 21 includes a monitor register for monitoring the state of the OTG controller 20, and a control register. The OTG register section 21 includes a circuit which decodes the state command set by the firmware (CPU).

The OTG controller 20 includes an OTG control circuit 22. The OTG control circuit 22 includes an OTG management circuit 23 which manages the state, an ID detection circuit 24 which detects the voltage level of the ID pin, and a VBUS detection circuit 25 which detects the VBUS voltage level. The OTG control circuit 22 includes a line state detection circuit 26 which detects the state of the USB bus (reset, resume, or the like) based on line state information (J, K, SE0, or the like) from the transceiver 10.

The OTG controller 20 includes a timer 27 which measures time. The line state detection circuit 26 detects the state of the USB (bus) based on the line state information (J, K, SE0, or the like) from the transceiver 10 and time measurement information from the timer 27.

As the information which must be detected to cause transitions of the state of the host operation and the state of the peripheral operation, the state of the ID pin, the VBUS voltage level, and the line state of the data signal lines DP and DM can be given. The OTG controller 20 informs the firmware (CPU) of the information through the monitor register. The firmware changes its own state based on the information, and informs the OTG controller 20 of the transition destination state by setting the state command corresponding to the transition destination state in the control register. The OTG controller 20 decodes the state command, and performs VBUS power supply control and pull-up control and pull-down control of the data signal line DP (DM), thereby realizing the above-described SRP and HNP functions.

In this embodiment, the OTG controller 20 performs control in each state, and the firmware concentrates on the state transition management. As a result, the processing load of the firmware (CPU) can be reduced in comparison with the case of realizing the entire state control by the firmware, whereby efficient firmware can be provided.

The hardware circuit may determine the state transition instead of the firmware. Almost the entire processing of the OTG controller 20 (processing other than VBUS power supply control, pull-up control and pull-down control of the data signal line DP (DM), ID pin detection, and line state detection) may be realized by the firmware (software).

3.2.4 Buffer Controller

Figure 29:
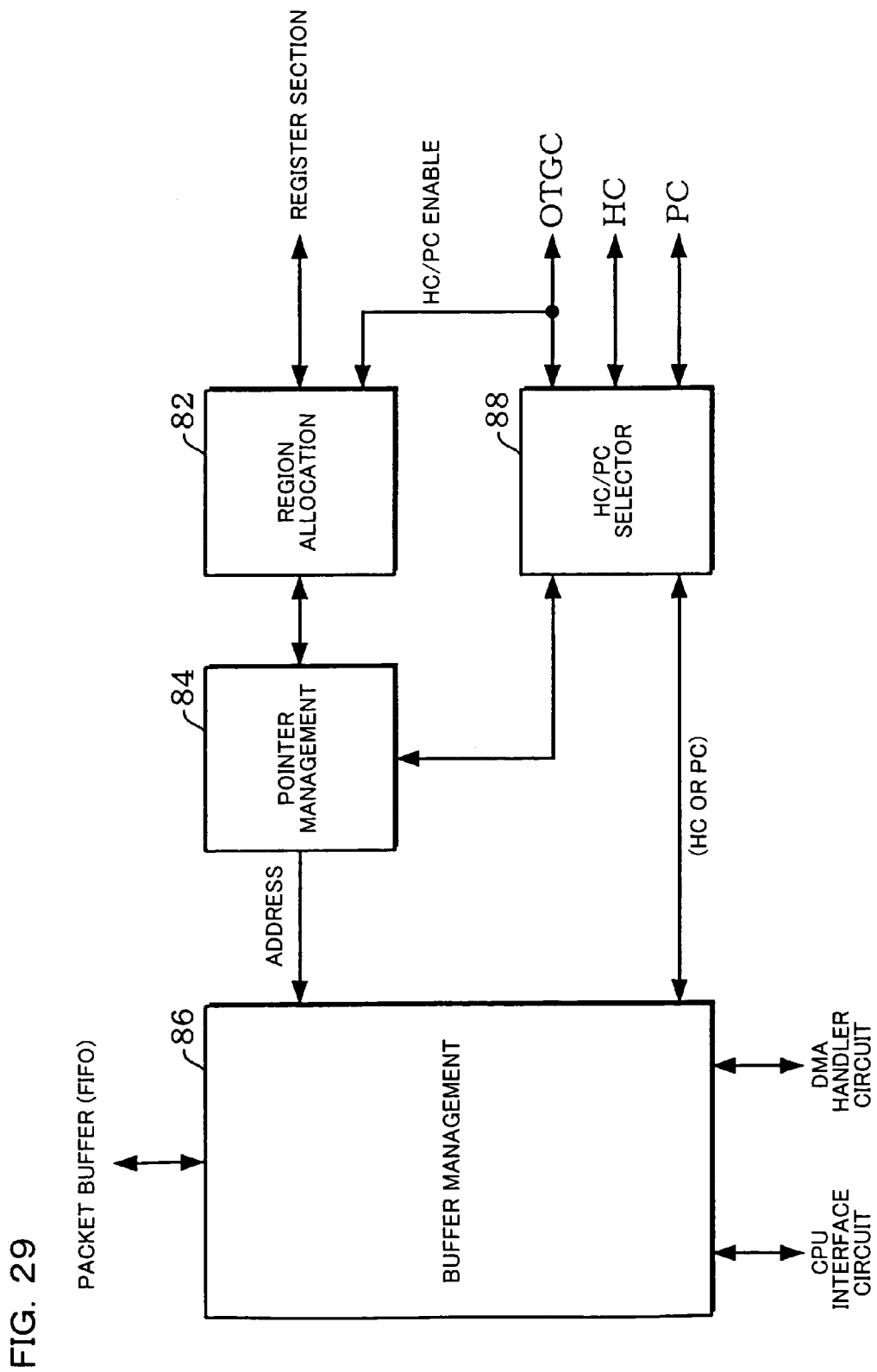
FIG. 29 is a block diagram of a configuration example of a buffer controller.

FIG. 29 shows a block diagram of a configuration example of the buffer controller 80.

The buffer controller 80 includes a region allocation section 82. The region allocation section 82 allocates a buffer region (region which is assigned to the pipe region during the host operation and is assigned to the endpoint region during the peripheral operation) in the packet buffer 100.

The region allocation section 82 calculates the region size, start address, and end address of the buffer region and the like from the maximum packet size MaxPktSize as the page size and the page number BufferPage. A write pointer and a read pointer of each buffer region are assigned to a DMA pointer, a CPU pointer, and a USB pointer corresponding to the data transfer direction. Pointer information (positional information) on the write pointer and the read pointer of each buffer region is retained by the transfer condition register 72 of the register section 70. The transfer condition register section 72 retains the pointer information for each buffer region.

The buffer controller 80 includes a pointer management section 84. The pointer management section 84 generates an actual address for accessing the packet buffer 100 while updating each pointer. In more detail, the pointer management section 84 generates a CPU address, a DMA address, and a USB address based on various pointers assigned by the region allocation section 82. The pointer management section 84 performs processing of updating the pointers each time access from the CPU (CPU interface circuit) or the DMA (DMA handler circuit) occurs, or each time the transaction of the USB (HC or PC) is completed (transmission or reception of a handshake packet such as ACK or NAK). The updated pointer information is written into the transfer condition register section 72 of the register section 70 through the region allocation section 82.

The buffer controller 80 includes a buffer management section 86. The buffer management section 86 manages access to the packet buffer 100. The buffer management section 86 receives an address from the pointer management section 84, and inputs or outputs data to or from the packet buffer 100 or outputs an address, output enable, write enable, read enable, or the like.

The buffer management section 86 arbitrates between accesses from the CPU (CPU interface circuit), DMA (DMA handler circuit), and USB (HC or PC). One of the CPU address, DMA address, and USB address is output as the access address to the packet buffer 100 based on the arbitration result, whereby a data transfer path between the CPU, DMA, or USB and the packet buffer 100 is established.

The buffer controller 80 includes an HC/PC selector 88. The HC/PC selector 88 performs switch control of connection between the buffer management section 86 and the host controller 50 or the peripheral controller 60. For example, the HC/PC selector 94 connects the host controller 50 with the buffer management section 86 during the host operation, and connects the peripheral controller 60 with the buffer management section 86 during the peripheral operation. The connection switch control is performed based on the HC/PC enable signal (HC_Enable) and the PC enable signal (PC_Enable) from the OTG controller 20.

Each section of the buffer controller 80 may be realized by a hardware circuit, or may be realized by firmware and a hardware circuit.

4. Electronic Instrument

Figure 30:
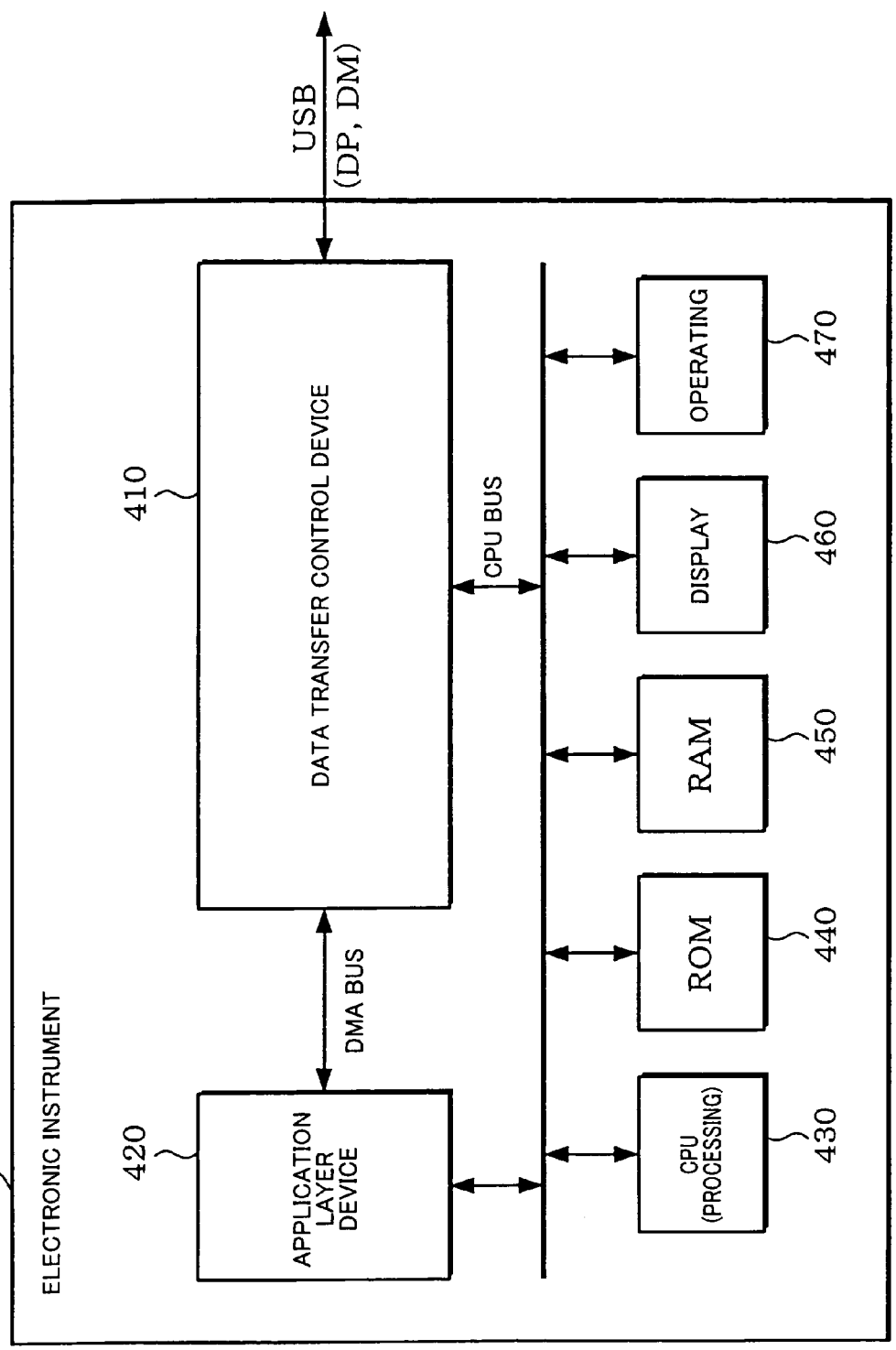
FIG. 30 shows a configuration example of an electronic instrument.

FIG. 30 shows a configuration example of an electronic instrument including the data transfer control device in this embodiment. An electronic instrument 400 includes a data transfer control device 410 in this embodiment, an application layer device 420 formed by ASIC or the like, a CPU (processing section) 430, a ROM 440, a RAM 450, a display section 460, and an operating section 470. The electronic instrument 400 may have a configuration in which some of these functional blocks are omitted.

The application layer device 420 (device which performs output processing, fetch processing, or storage processing of data transmitted through the data transfer control device 410 and a bus in a broad sense) is a device which controls a hard disk drive, an optical disk drive, or a printer, a device which includes an MPEG encoder and an MPEG decoder, or the like. The CPU 430 (processing section) controls the data transfer control device 410 and the entire electronic instrument. The ROM 440 stores a control program and various types of data. The RAM 450 functions as a work area or a data storage area for the CPU 430 and the data transfer control device 410. The display section 460 displays various types of information to a user. The operating section 470 allows a user to operate the electronic instrument.

In FIG. 30, a DMA bus and a CPU bus are separated. However, the DMA bus and the CPU bus may be a common bus. The CPU 430 may be included in the data transfer control device 410, or a CPU which controls the data transfer control device 410 and a CPU which controls the electronic instrument may be separately provided. As examples of electronic instruments to which this embodiment can be applied, optical disk (CD-ROM and DVD) drives, magneto-optical (MO) disk drives, hard disk drives, TVs, TV tuners, VTRs, video cameras, audio devices, telephones, projectors, personal computers, electronic notebooks, PDAs, word processors, and the like can be given.

The present invention is not limited to the above-described embodiment. Various modifications and variations are possible within the spirit and scope of the present invention.

For example, the configuration of the data transfer control device in the present invention is not limited to the configuration described with reference to FIG. 11 and the like. Various modifications and variations are possible. For example, the present invention may be applied to a data transfer control device in which the configuration such as the OTG controller 20, the HC/PC switch circuit 30, the peripheral controller 60, and the like shown in FIG. 11 is omitted, and which does not have the peripheral function and has only the simple host function. The above description mainly illustrates the case where the data transfer control device is in the FS mode of the USB standard. However, the present invention may be applied to the LS mode of the USB standard. The present invention may be applied to the HS mode of the USB standard by replacing the frame described in the specification and the drawings by the micro frame in the HS mode of the USB standard.

The terms (OTG controller, CPU and firmware, host controller and peripheral controller, USB, pipe region and endpoint region, and the like) cited in the description in the specification and the drawings as the terms in a broad sense (state controller, processing section, transfer controller, bus, buffer region, and the like) may be replaced by the terms in a broad sense in another description in the specification and the drawings.

Part of requirements of any claim of the present invention could be omitted from a dependent claim which depends on that claim. Moreover, part of requirements of any independent claim of the present invention could be made to depend on any other independent claim.

The above-described embodiment illustrates an application example of the USB OTG standard. However, application of the present invention is not limited to the OTG standard. For example, the present invention may be applied to data transfer in a standard based on the same idea as the OTG standard or a standard developed from the OTG standard.

What is claimed is:

1. A data transfer control device for data transfer through a bus, the data transfer control device comprising:
    a buffer controller which controls access to a packet buffer which stores data;
    a transfer controller which controls transfer of the data stored in the packet buffer; and
    a state controller which controls a plurality of states including a state of a host operation in which the data transfer control device operates in a role of a host, and a state of a peripheral operation in which the data transfer control device operates in a role of a peripheral,
    wherein the transfer controller includes:
    a host controller which transfers data as the host during the host operation; and
    a peripheral controller which transfers data as the peripheral during the peripheral operation, and
    wherein, during the host operation, the buffer controller allocates a plurality of pipe regions in the packet buffer, and the host controller transfers data between one of the allocated pipe regions and an endpoint corresponding to the one of the pipe regions;
    wherein a transaction for performing data transfer with a transfer destination is issued, and
    wherein, when a negative acknowledgment (NAK) response to the issued transaction is returned from the transfer destination, issuance of a retransmission transaction for the NAK response is allowed after waiting for a predetermined skip timing.

2. The data transfer control device as defined in claim 1, wherein, on condition that the retransmission transaction for the NAK response has been issued one or more times, issuance of a next retransmission transaction is allowed after waiting for the predetermined skip timing.

3. The data transfer control device as defined in claim 2, comprising:
    a counter which is initialized when a positive acknowledgment (ACK) response is returned from the transfer destination, and counts the NAK response from the transfer destination,
    wherein issuance of a retransmission transaction for a last NAK response returned when a count of the NAK response has reached a predetermined number is allowed after waiting for the predetermined skip timing.

4. The data transfer control device as defined in claim 1, wherein the predetermined skip timing is within a frame subsequent to a frame in which the NAK response has been returned.

5. The data transfer control device as defined in claim 1, wherein a plurality of skip timings are set in one frame, each of the plurality of skip timings designating a timing in one frame.

6. The data transfer control device as defined in claim 5, wherein the predetermined skip timing is a skip timing among the plurality of the skip timings which comes first after the transaction has been issued.

7. The data transfer control device as defined in claim 1, comprising:
    a skip mode setting register which is used for setting whether or not to allow issuance of the retransmission transaction after waiting for the predetermined skip timing,
    wherein the skip mode setting register is provided for each endpoint of a peripheral.

8. The data transfer control device as defined in claim 1, which performs data transfer conforming to a Universal Serial Bus (USB) On-The-Go (OTG) standard.

9. The data transfer control device as defined in claim 1 further comprising:
    a device which performs output processing, fetch processing or storage processing of the data transferred through the data transfer control device and the bus; and
    a processing section which controls data transfer of the data transfer control device.

10. The data transfer control device as defined in claim 1, comprising:
    a skip timing setting register which is used for setting the skip timing,
    wherein the skip timing setting register is provided for each endpoint of a peripheral.

* * * * *